(12) United States Patent
Dos Santos

(10) Patent No.: US 9,258,948 B2
(45) Date of Patent: Feb. 16, 2016

(54) SYSTEM FOR PLANT CULTIVATION IN CONTAINERS IN A VERTICAL OR SLOPED ARRANGEMENT

(71) Applicant: Modulogreen Vertical Solutions, Vila Real (PT)

(72) Inventor: Jose Dos Santos, Avrainville (FR)

(73) Assignee: MODULOGREEN VERTICAL SOLUTIONS, Vila Real (PT)

( * ) Notice: Subject to any disclaimer, the term of this patent is extended or adjusted under 35 U.S.C. 154(b) by 0 days.

(21) Appl. No.: 14/597,326

(22) Filed: Jan. 15, 2015

(65) Prior Publication Data

US 2015/0121756 A1    May 7, 2015

Related U.S. Application Data

(63) Continuation of application No. 13/504,560, filed as application No. PCT/FR2010/052298 on Oct. 27, 2010, now Pat. No. 8,950,112.

(30) Foreign Application Priority Data

Oct. 30, 2009  (FR) ..................................... 09 57705

(51) Int. Cl.
*A01G 25/00* (2006.01)
*A01G 9/02* (2006.01)
*A01G 27/00* (2006.01)

(52) U.S. Cl.
CPC  *A01G 9/02* (2013.01); *A01G 9/025* (2013.01); *A01G 27/005* (2013.01)

(58) Field of Classification Search
USPC ........... 47/79, 82, 83, 59 R, 62 R, 62 A, 62 N
See application file for complete search history.

(56) References Cited

U.S. PATENT DOCUMENTS

| | | | |
|---|---|---|---|
| 2,279,735 A | | 4/1942 | Gates |
| 4,161,085 A | | 7/1979 | Moffett, Jr. |
| 4,380,136 A | | 4/1983 | Karpisek |
| 5,099,606 A | * | 3/1992 | Koerper ......................... 47/66.1 |
| 5,669,185 A | | 9/1997 | Proulx |
| 7,243,460 B2 | * | 7/2007 | Darlington .................... 47/62 R |
| 7,877,927 B2 | * | 2/2011 | Roy et al. ...................... 47/62 C |
| 7,921,599 B2 | | 4/2011 | Irwin |
| 8,281,517 B2 | * | 10/2012 | MacKenzie ....................... 47/83 |
| D720,947 S | * | 1/2015 | Meyer ............................ D6/558 |
| 8,966,819 B1 | * | 3/2015 | Cosmann .......................... 47/83 |

(Continued)

FOREIGN PATENT DOCUMENTS

| | | |
|---|---|---|
| DE | 3420037 A1 | 5/1985 |
| FR | 2926952 A1 | 8/2009 |

(Continued)

*Primary Examiner* — Kristen C Hayes
(74) *Attorney, Agent, or Firm* — Leydig, Voit & Mayer, Ltd.

(57) ABSTRACT

A system for plant cultivation in containers located in a vertical or sloping arrangement on different levels includes a module. The module includes an internal volume for receiving at least one nutritive substrate and at least one plant. The internal volume is delimited by a front wall having at least one opening for the plants to pass through for exposure to light, and a rear wall joined to the front wall. The rear wall has a fixing area for fixing the module to a mounting, and the rear wall includes a partitioning rib projecting into the internal volume to slow flow of water flowing between the levels.

9 Claims, 31 Drawing Sheets

(56) References Cited

U.S. PATENT DOCUMENTS

| | | |
|---|---|---|
| 2007/0079553 A1 | 4/2007 | Genma et al. |
| 2007/0094927 A1 | 5/2007 | Perry |
| 2008/0000153 A1* | 1/2008 | Sugiyama et al. ............. 47/47 |
| 2010/0095584 A1 | 4/2010 | Huet et al. |
| 2010/0095586 A1 | 4/2010 | Sichello |
| 2010/0146855 A1* | 6/2010 | Ma ................................... 47/82 |
| 2011/0258925 A1* | 10/2011 | Baker ........................... 47/65.8 |
| 2013/0219788 A1* | 8/2013 | VanLente ..................... 47/62 A |

FOREIGN PATENT DOCUMENTS

| | | | | |
|---|---|---|---|---|
| GB | 2 239 155 A | | 6/1991 | |
| GB | 2239155 A | * | 6/1991 | ............ A01G 9/02 |
| JP | 6-38468 U | | 5/1994 | |
| JP | 2002-199818 A | | 7/2002 | |
| JP | 2002-291328 A | | 10/2002 | |
| JP | 2002-335765 A | | 11/2002 | |
| JP | 2004-337054 A | | 12/2004 | |
| JP | 2004-350528 A | | 12/2004 | |
| WO | WO 2009/098762 A1 | | 8/2009 | |

* cited by examiner

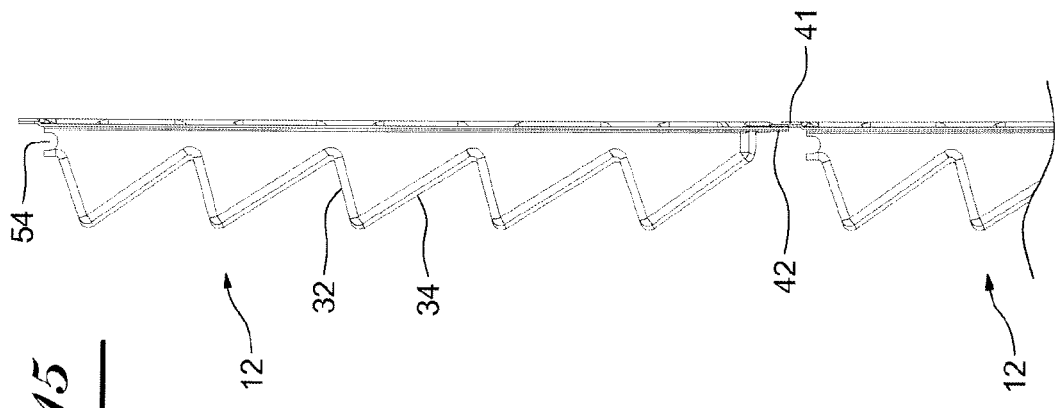
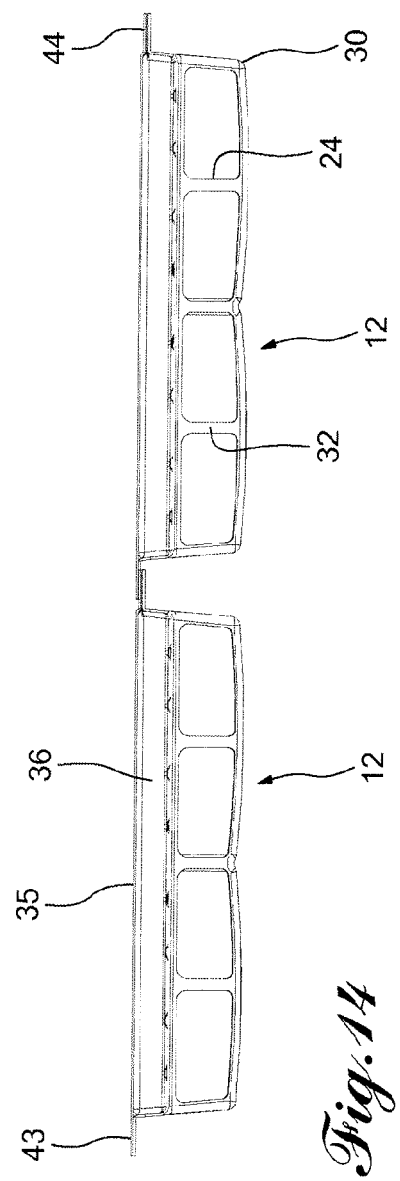

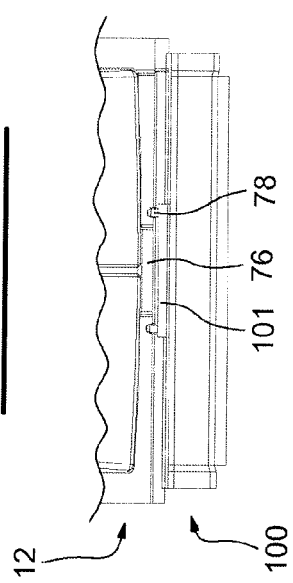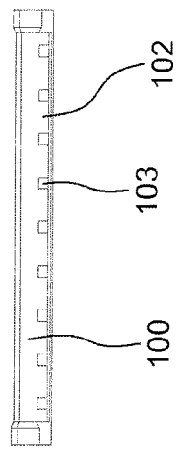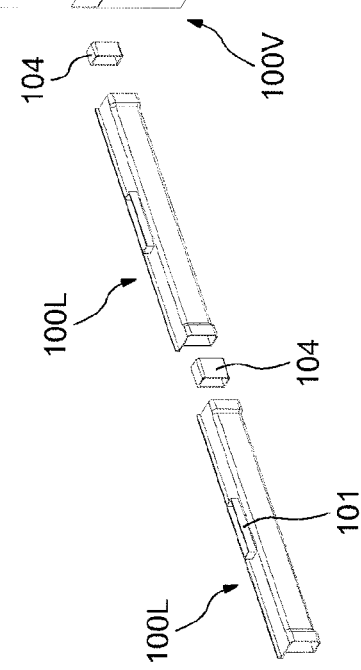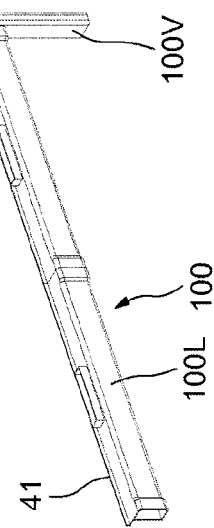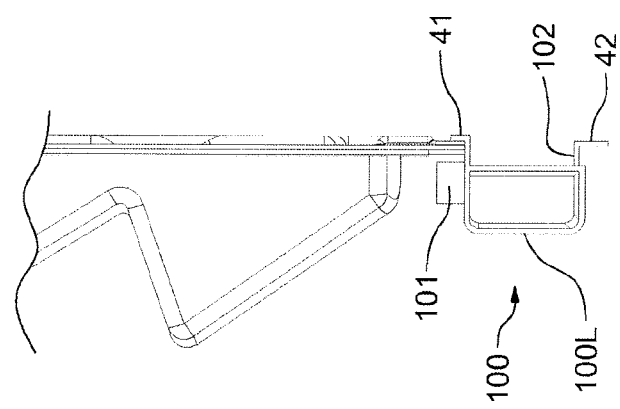

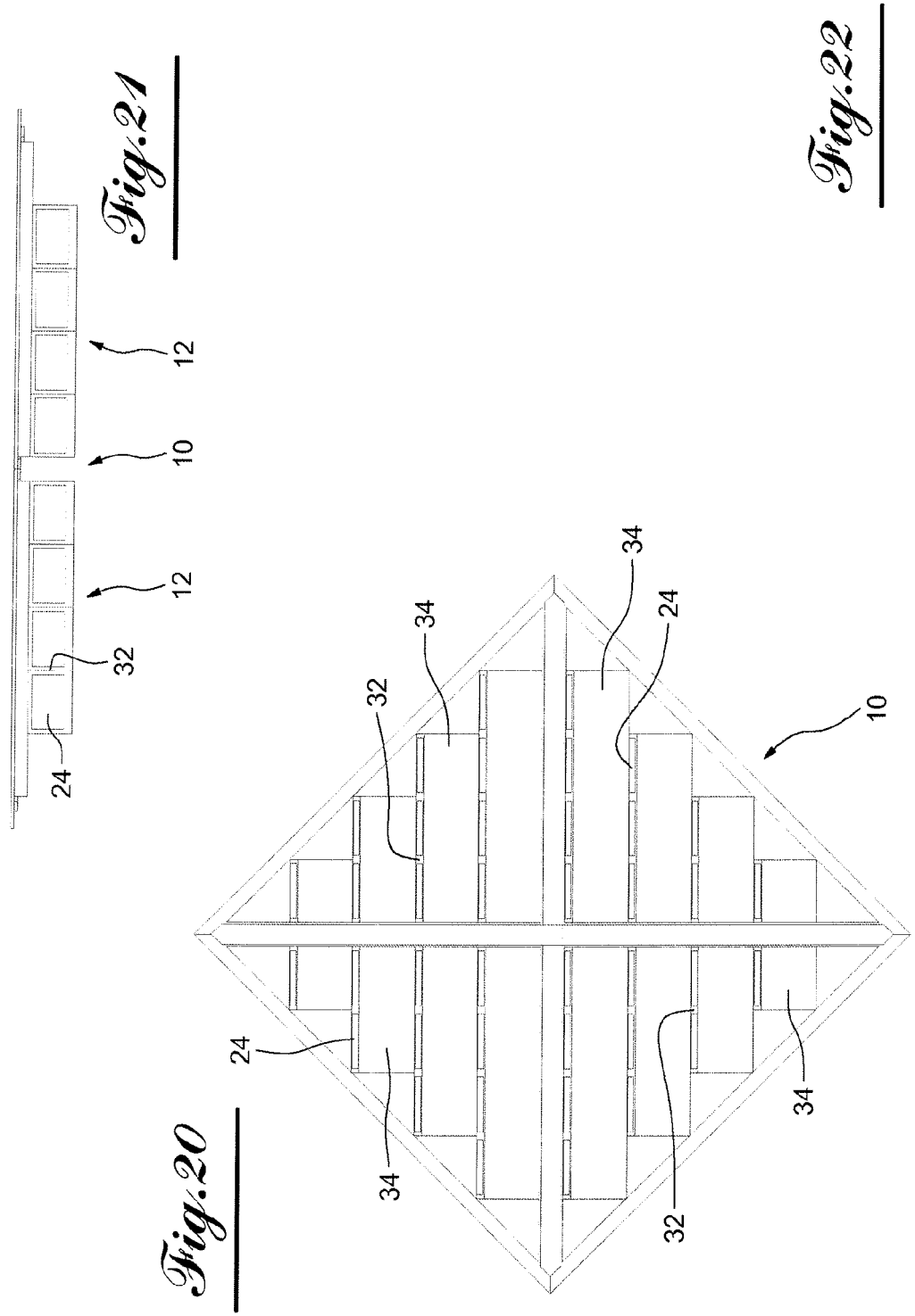

SYSTEM FOR PLANT CULTIVATION IN CONTAINERS IN A VERTICAL OR SLOPED ARRANGEMENT

FIELD OF THE INVENTION

This invention concerns a system for a vertical or sloping arrangement for container plant cultivation.

BACKGROUND

An example of a system for a vertical arrangement for container plant cultivation is known from document FR-A-2 902 602. In this document, the system receives a nutritive substrate positioned vertically, in which the plants are planted horizontally. This layout poses growth problems for the plants, as usually their stems and roots must be planted basically vertically for photosynthesis to function correctly. In addition, when the plants are planted, it is difficult not to lose the nutritive substrate as there is no basically vertical wall to contain the substrate. Moreover, fixing this type of system is difficult because the fixing systems are subject to corrosion, encouraged by the fertilizer and the irrigation of the plants, as it is difficult to stop the irrigation water from flowing onto the fixing systems.

SUMMARY OF THE INVENTION

The main aim of this invention is to remedy the drawbacks of the previous art.

For this purpose, the subject of the invention is a system for a vertical or sloping arrangement for container plant cultivation, comprising at least one module forming an internal volume intended to receive at least one nutritive substrate and plants and delimited by a front wall and rear wall joined to the front wall, with at least the front wall having at least one opening for the plants to pass through and at least one out of the front and rear walls having a fixing area intended for fixing the module to a mounting. In this system, at least one out of the front wall and the rear wall comprises overlapping edges which, when the system is installed as a roof garden or plant wall comprising at least two adjacent modules, enables the modules to overlap at least partially in the roof or wall.

In several embodiments of the system according to the invention, recourse may also be made to one and/or another of the following systems:

a water drain opens out at a lower part of the internal volume;

the water drain extends into the bottom edge of the module, with the bottom edge comprising a least one front notch for this purpose;

the water drain is a slot between the front wall and rear wall;

there is a gutter to collect the water passing through the drain;

the gutter is built into the bottom edge by means of a suitable shelf of the bottom edge of the front wall;

there is a water inlet hole between the front wall and rear wall;

the system according to the invention is suitable for being installed as a roof garden or a plant wall and can comprise at least two adjacent modules which overlap at least partially in the roof or wall, with at least one out of the front wall and the rear wall comprising overlapping edges;

the rear wall comprises vertical stops projecting forward on which a lower edge of an adjacent module positioned on top can rest;

the edges of the front wall and the edges of the rear wall are joined together and form the fixing area of the module;

a water tank is located between the front wall and the rear wall;

the water tank consists of a removable tank;

the front wall comprises at least one basically horizontal part which delimits the opening;

the front wall comprises a sloped part connected to the front of the horizontal part and extending towards the bottom and towards the rear;

the system comprises a water inlet opening between the front wall and the rear wall;

the rear wall comprises a rib for partitioning or retaining water which is basically horizontal, projecting into the internal volume;

the partitioning rib is positioned slightly below the bottom edge of the opening;

the fixing area is on at least one portion of the periphery of the module, on the perimeter of the internal volume;

the rear wall comprises vertical stops projecting forward on which a lower edge of an adjacent module positioned on top can rest;

the system comprises a removable mounting and is equipped with lateral connections suitable for forming jointed connections when two modules or sets of modules are assembled horizontally.

BRIEF DESCRIPTION OF DRAWING FIGURES

Other aims, features and advantages of the invention will be revealed during the course of the following description of several embodiments, given as non-limiting examples, with regard to the attached drawings.

FIGS. 13, 14 and 15 are technical drawings of a system with several modules of FIGS. 6 and 7, front, top and side views respectively;

FIGS. 18A, 18B, 18C, 18C, 18E and 18F are technical drawings of a gutter of the system according to the invention, side view, exploded three-quarter perspective front view, assembled three-quarter perspective front view, view of front assembled on a module according to FIG. 8, and top and bottom views respectively;

FIGS. 19, 20, 21 and 22 are technical drawings of a third embodiment of the system according to the invention having several triangular modules, exploded perspective view, and assembled front, top and side views respectively;

Figure 28A:
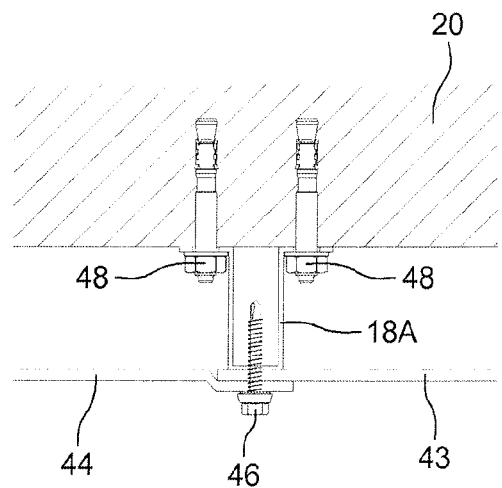
Figure 28B:
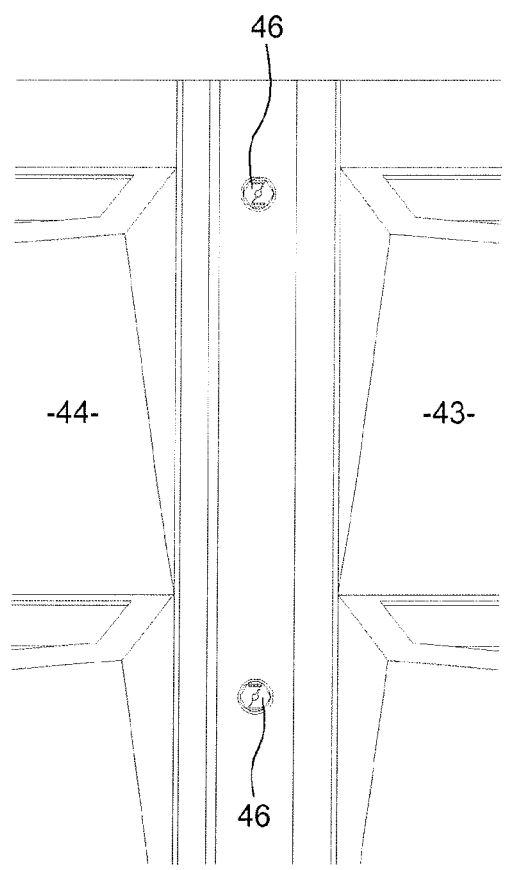
Figure 29A:
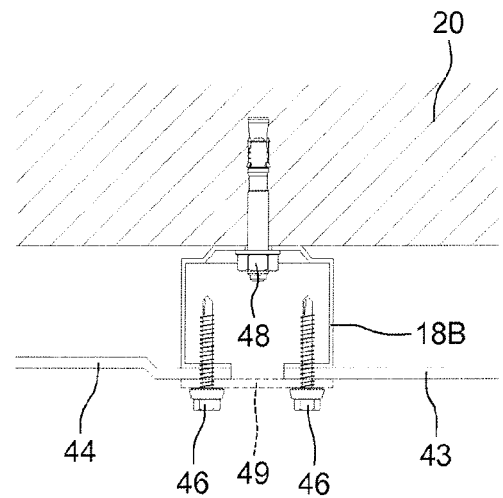
Figure 29B:
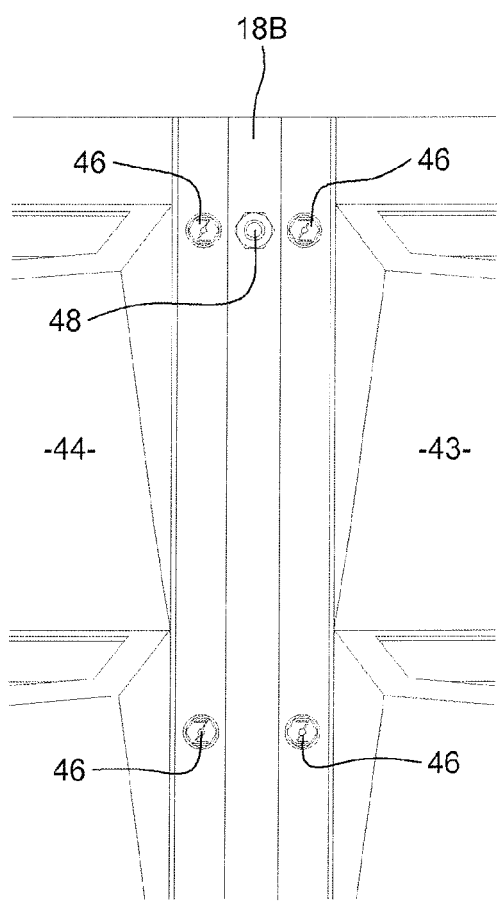
Figure 30A:
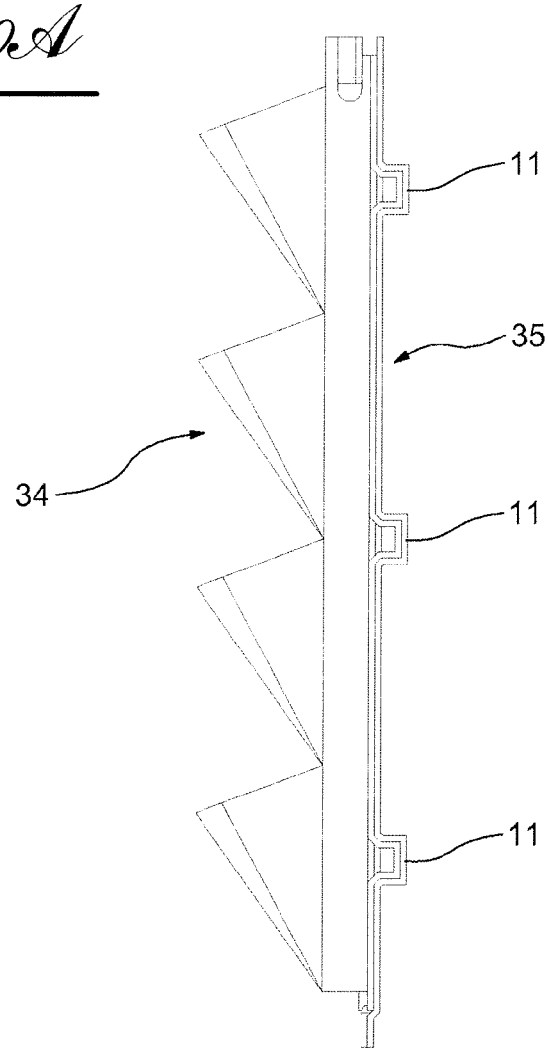
Figure 30B:
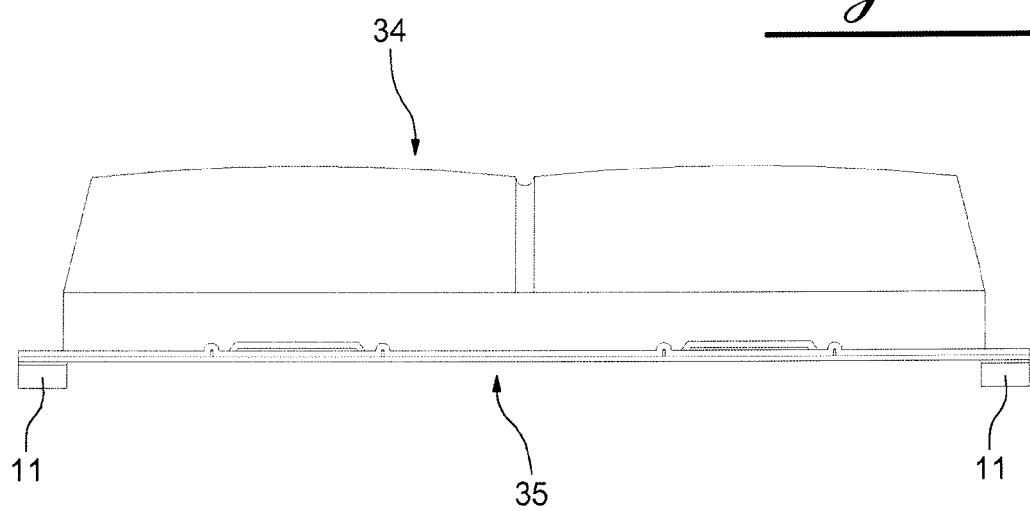
Figure 31:
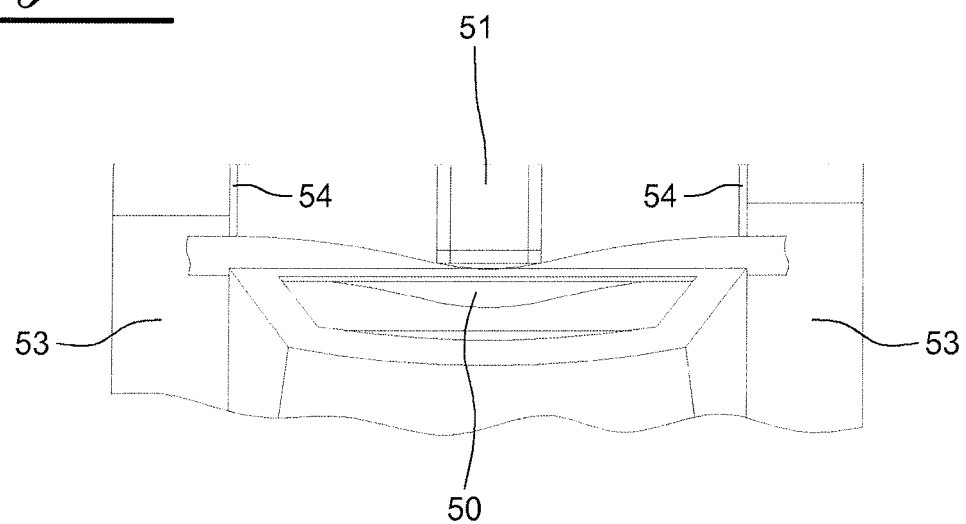
Figure 32A:
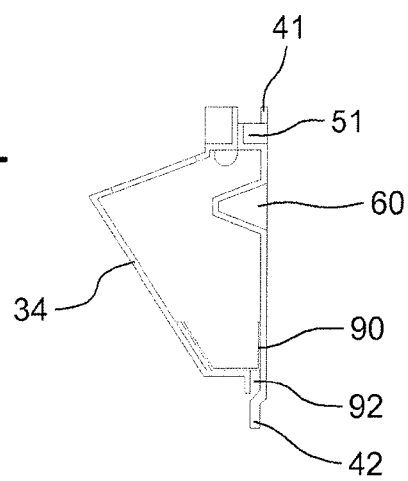
Figure 32B:
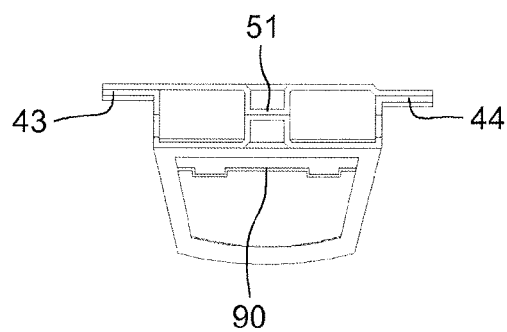
Figure 32C:
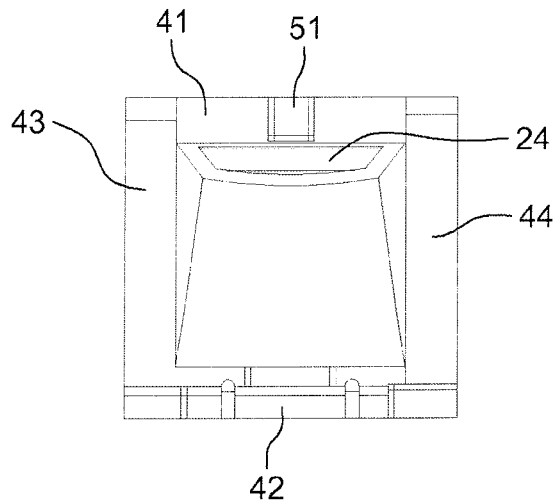
Figure 33:
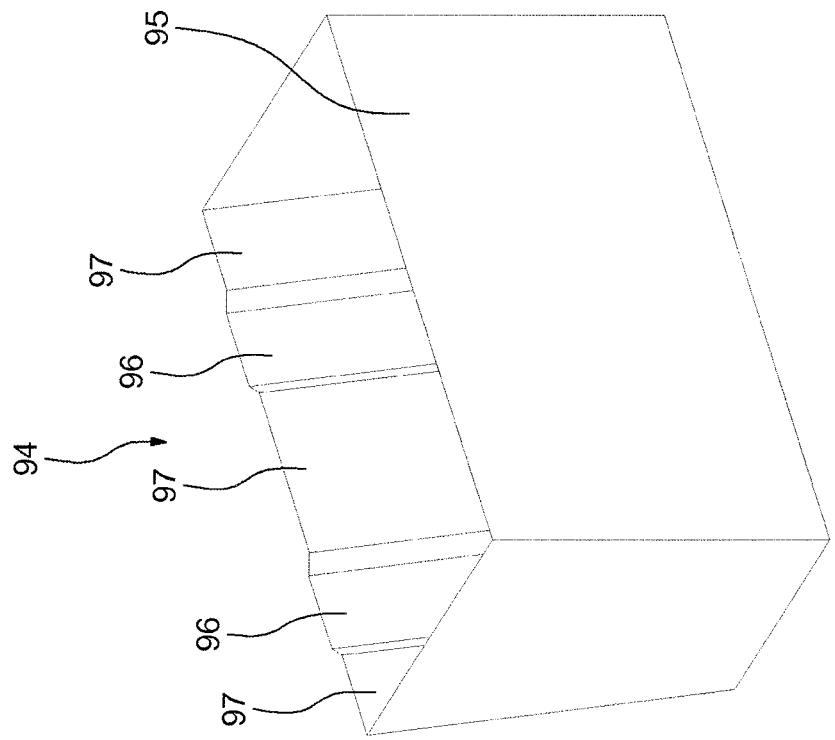
Figure 34B:
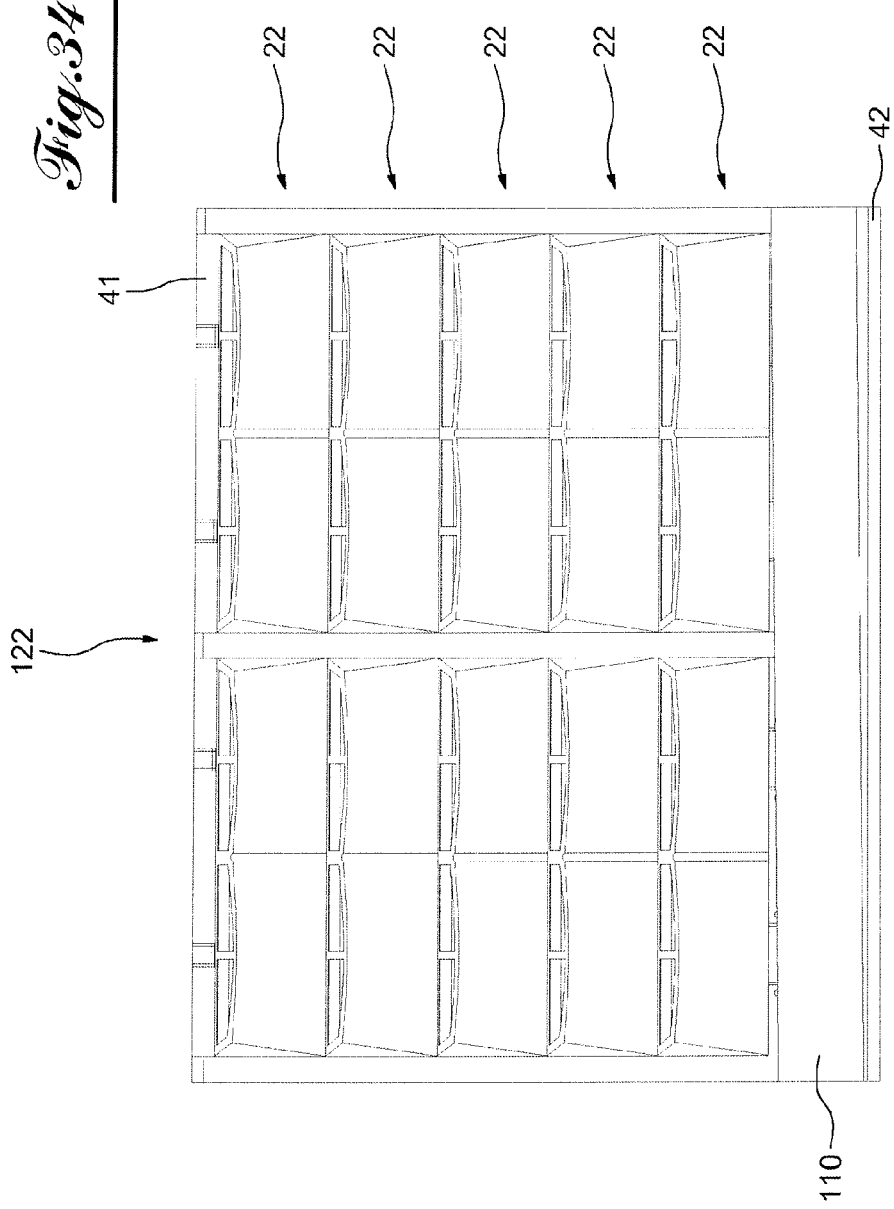
Figure 34A:
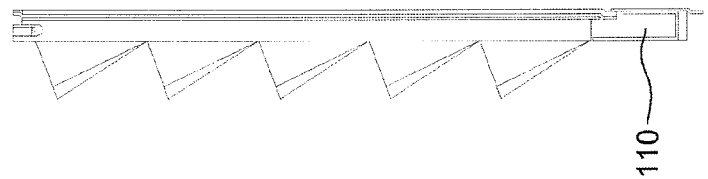
Figure 35:
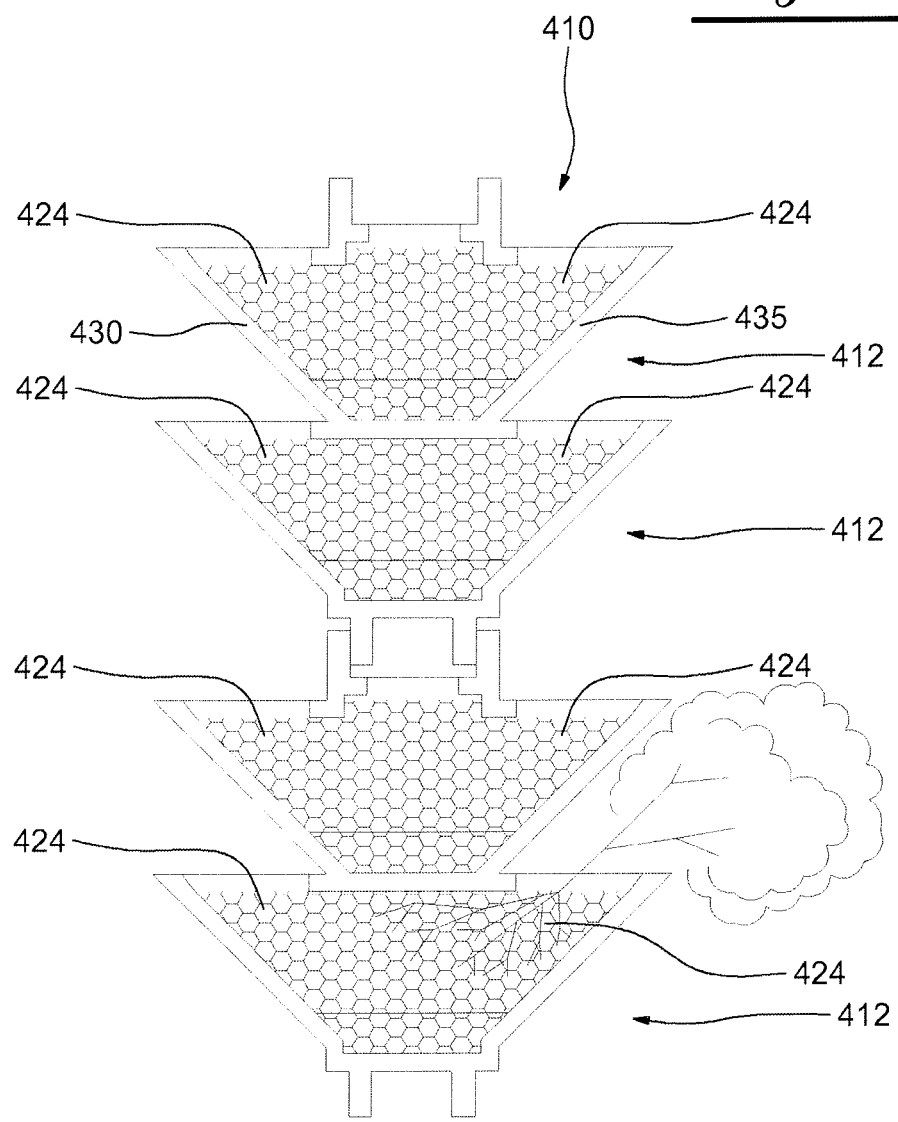
Figure 36:
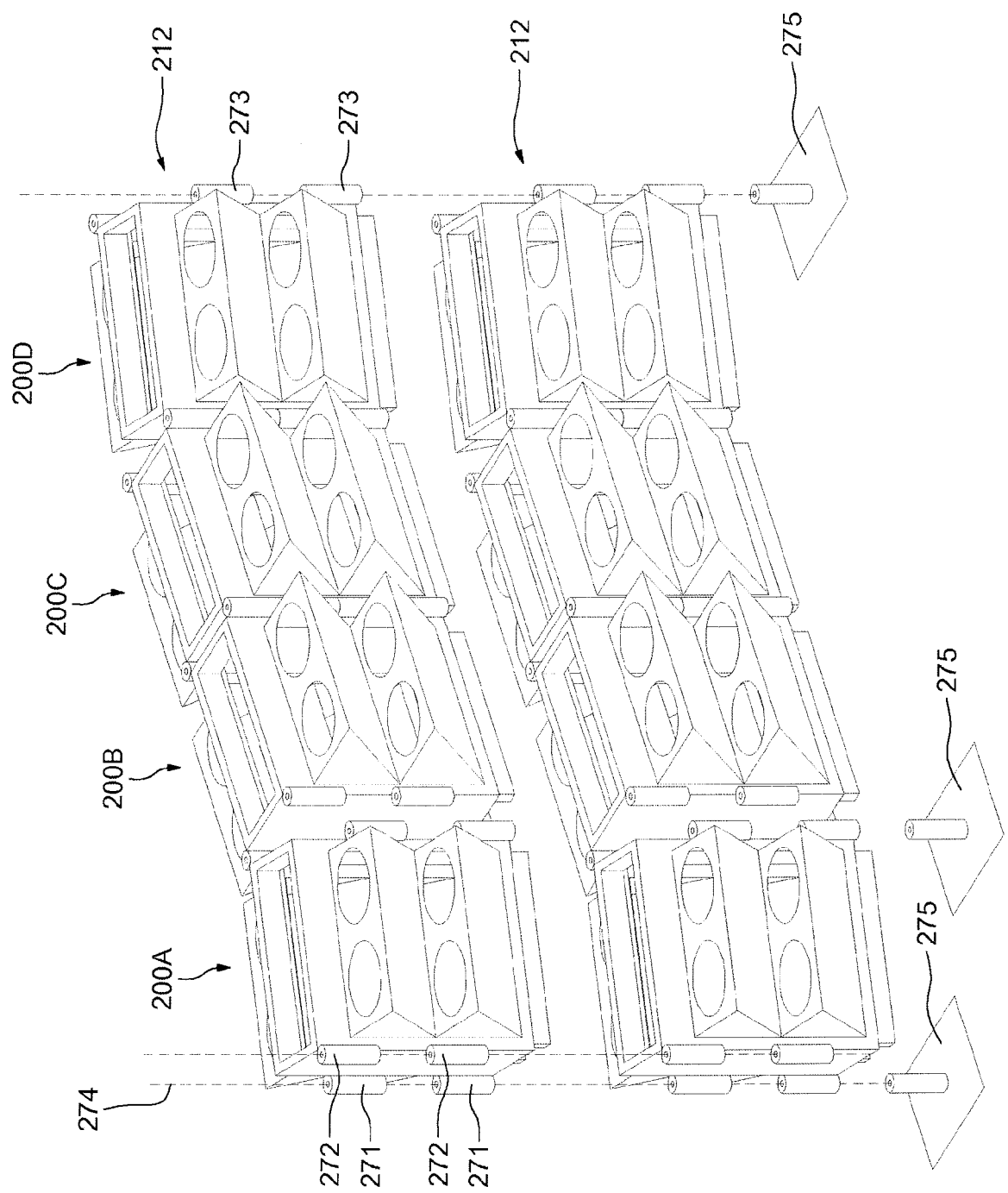
Figure 37:
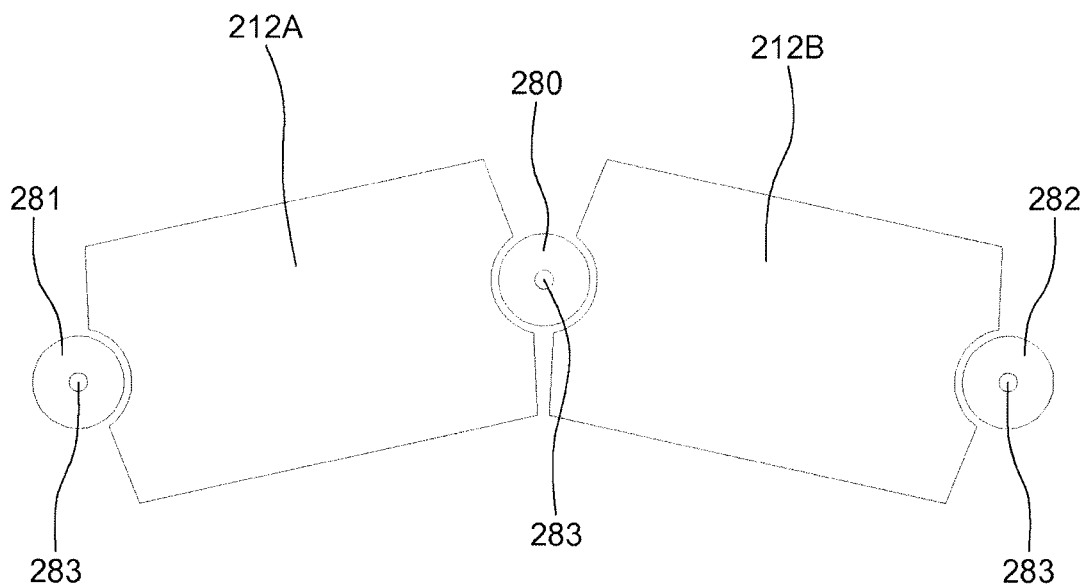

FIGS. 28A, 29A and 30A on the one hand and FIGS. 28B, 29B and 30B on the other hand, show respectively, in top and frontal views, variants of mountings for the systems of the invention;

FIG. 31 shows a variant of the layout of the watering pipe;

FIGS. 32A, 32B and 32C show, in a section view, top view and frontal view respectively, another alternative embodiment of the means of supplying water to the system of the invention;

FIG. 33 is a perspective view of a water tank;

FIGS. 34A, 34B show, in a lateral view and a frontal view respectively, an alternative embodiment of realization of a gutter;

FIGS. 35 to 37 show systems of the invention as space dividers; and

Figure 38B:
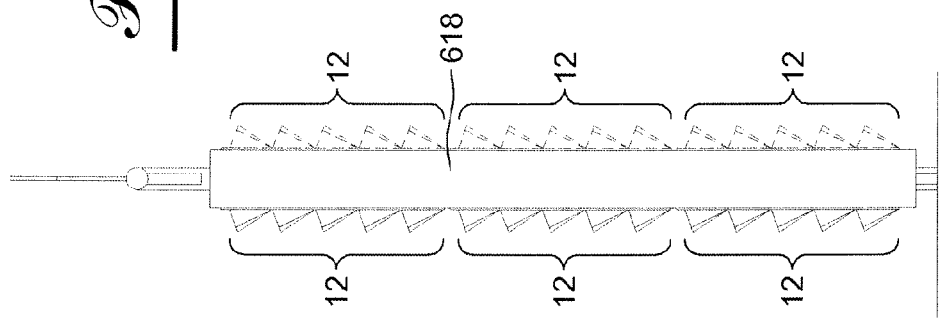
Figure 38A:
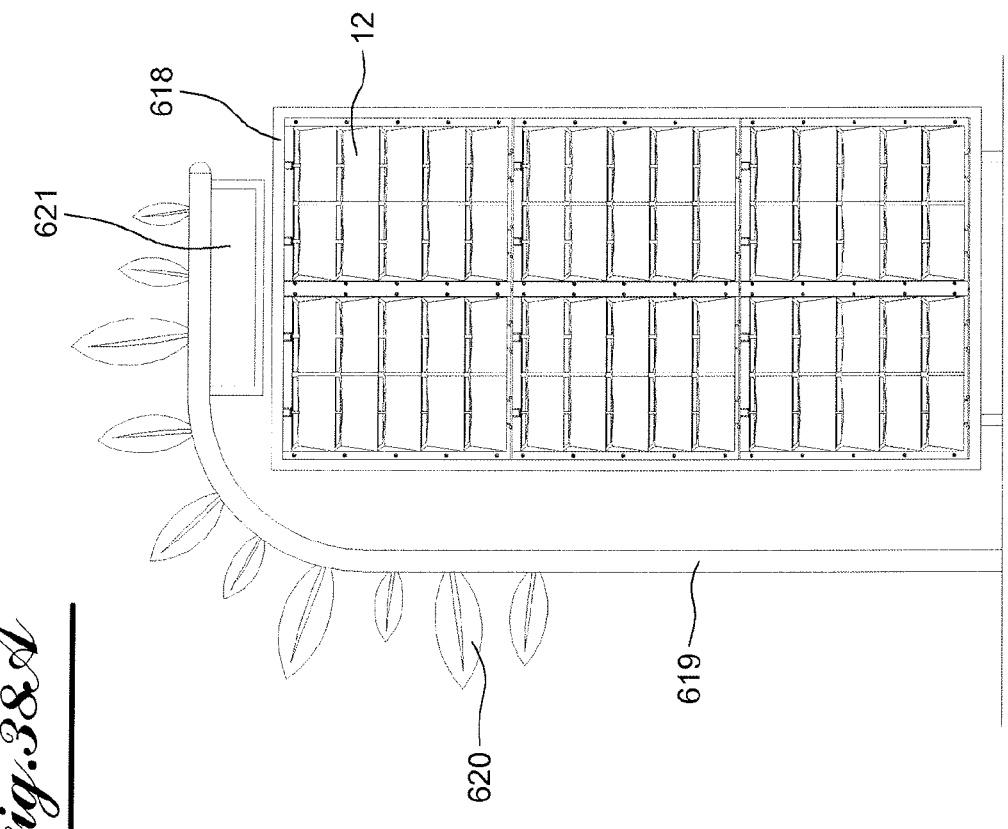

FIGS. 38A, 38B show, in a frontal view and a side view respectively, a system of the invention as an entrance decoration.

In the different figures, the same references indicate identical or similar components.

DETAILED DESCRIPTION

With reference to the figures, the reference 10 indicates a system, or device, according to the invention for a vertical or sloping arrangement for container plant cultivation, in order to form a plant wall or roof garden respectively.

In the description below, the vertical direction designated V is understood considering the system in an assembly position in which it is in use to form the plant wall or roof garden. The horizontal direction designated L follows the length of the system and the horizontal direction designated T follows the width of the system. For modules intended to be mounted on a surface mounting, for example on a wall, the front is the decorated side of the plant wall, corresponding to the visible face of the wall covered by the plants, and the rear is on the non-decorated side of the plant wall, so facing the mounting. And for modules intended to be used as dividing components with two opposite decorated sides, the front is either decorated side without distinction and the rear is the other decorated side.

The system 10, or device, comprises at least one module 12 determining an internal volume 14 intended to receive at least one nutritive substrate and plants 16, in this instance the roots and the lower part of the stems. In practice, the system 10 comprises several modules 12 mounted on vertical mountings 18 joined to a wall 20 or a structural framework.

Figure 1:
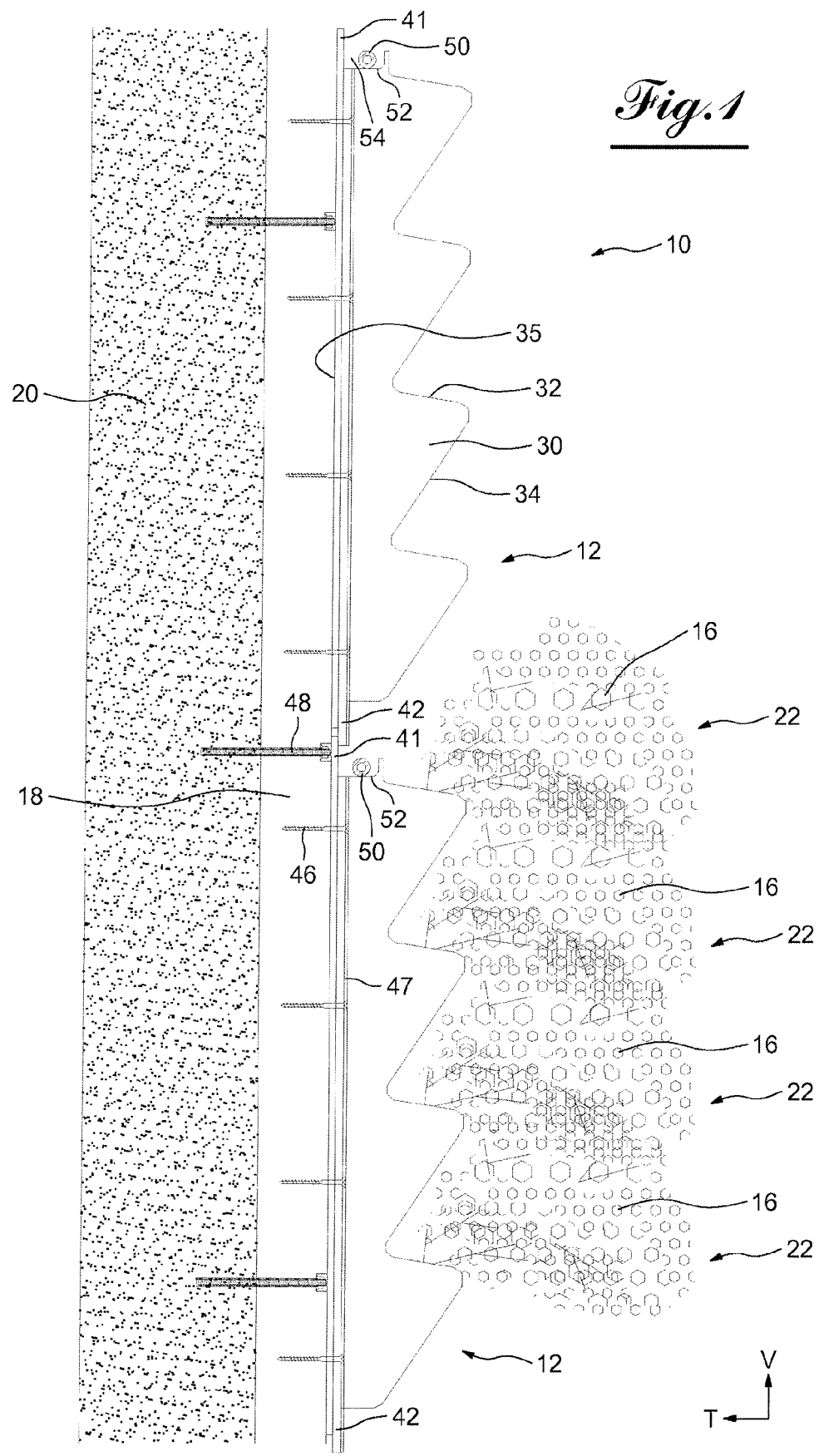
FIG. 1 is a schematic side view of a first embodiment of a system according to the invention, installed vertically on a wall of a building.
Figure 2:
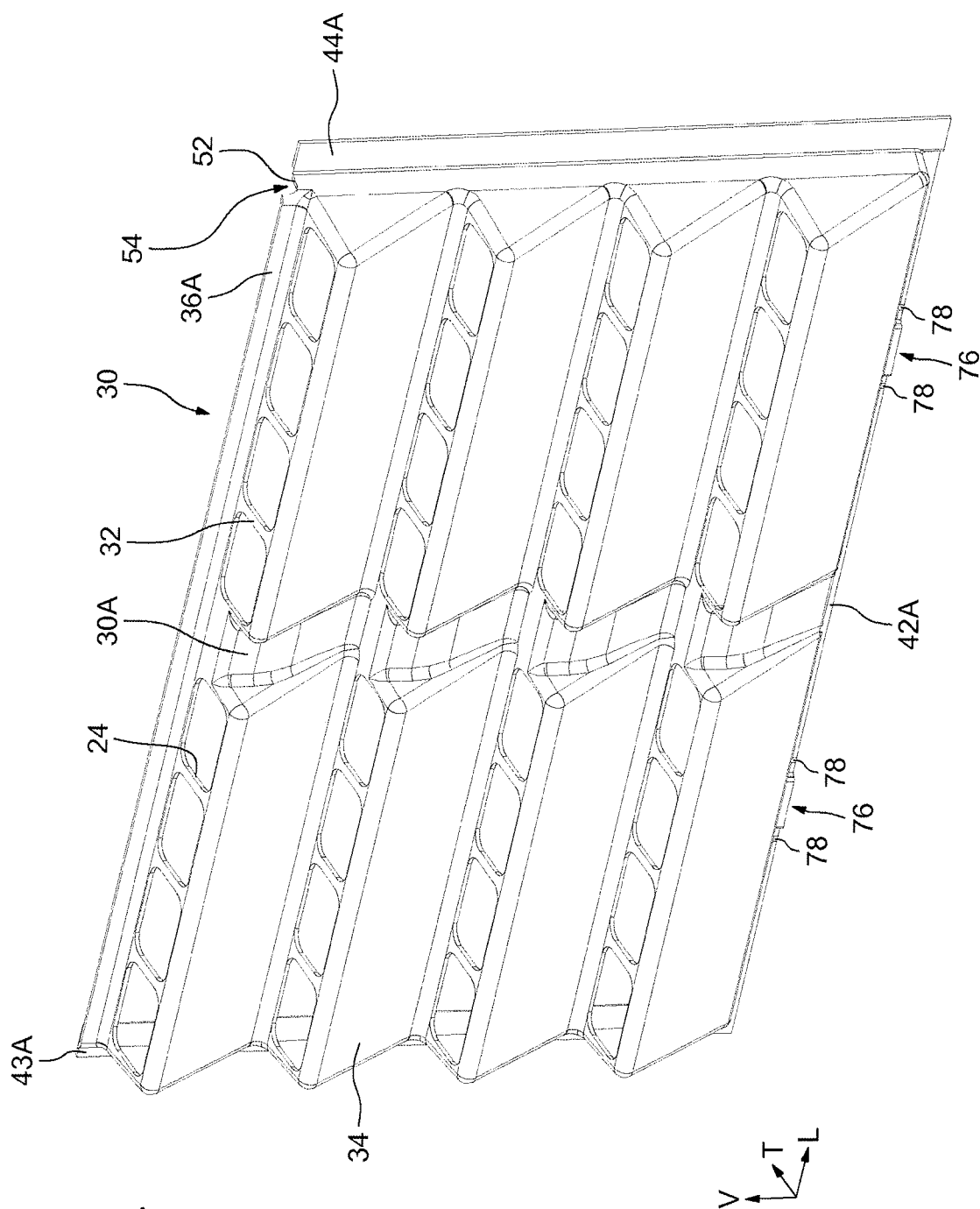
FIG. 2 is a three-quarter perspective frontal view technical drawing of a front wall of the module of the system of FIG. 1.

In the first embodiment of the system 10 represented in FIGS. 1 and 2, as installed vertically parallel to the wall 20 of a building, each module 12 is about 80 centimeters tall and 130 centimeters long. The module 12 is designed for four horizontal rows 22 of plants, distributed evenly along the height of the module.

The plants 16 have parts, in this instance stems and foliage, which pass through at least one opening 24, for their exposure to light.

As shown in FIGS. 1 and 2, the rows 22 can each receive eight bundles of plants 16, each bundle corresponding to an opening 24. The openings 24 are distributed into two groups 24A of four.

The internal volume 14 (FIG. 4) is delimited on one side by a front wall 30 comprising openings 24 suitable for plants 16 to pass through.

Each group 24A of four openings 24 is made in a basically horizontal part 32 of the front wall 30, this part enabling the nutritive substrate to be securely retained during planting of the plants. Each basically horizontal part 32 slopes slightly forwards and downwards, for example by ten to twenty degrees. This slight slope avoids retention of water and dead leaves. It facilitates the manufacture of the front wall 30 in a mould.

The front wall 30 also comprises a sloping part 34 connected to the front of each horizontal part 32 and extending towards the bottom and the rear.

The internal volume 14 is delimited on the other side by a rear wall 35 joined to the front wall 30, with the said walls 30 and 35 being different pieces.

On their periphery, the front wall 30 and the rear wall 35 are joined to each other in a water-tight manner, for example by gluing or laser welding, to prevent undesirable leaks of irrigation water, fertilizer and nutritive substrate.

Between the rear wall 35, the basically horizontal part 32 and the sloping part 34 of the front wall 30, one level of the internal volume 14 of basically triangular section corresponds to each row 22 of plants 16, the said levels of internal volume 14 communicating with each other.

Figure 4:
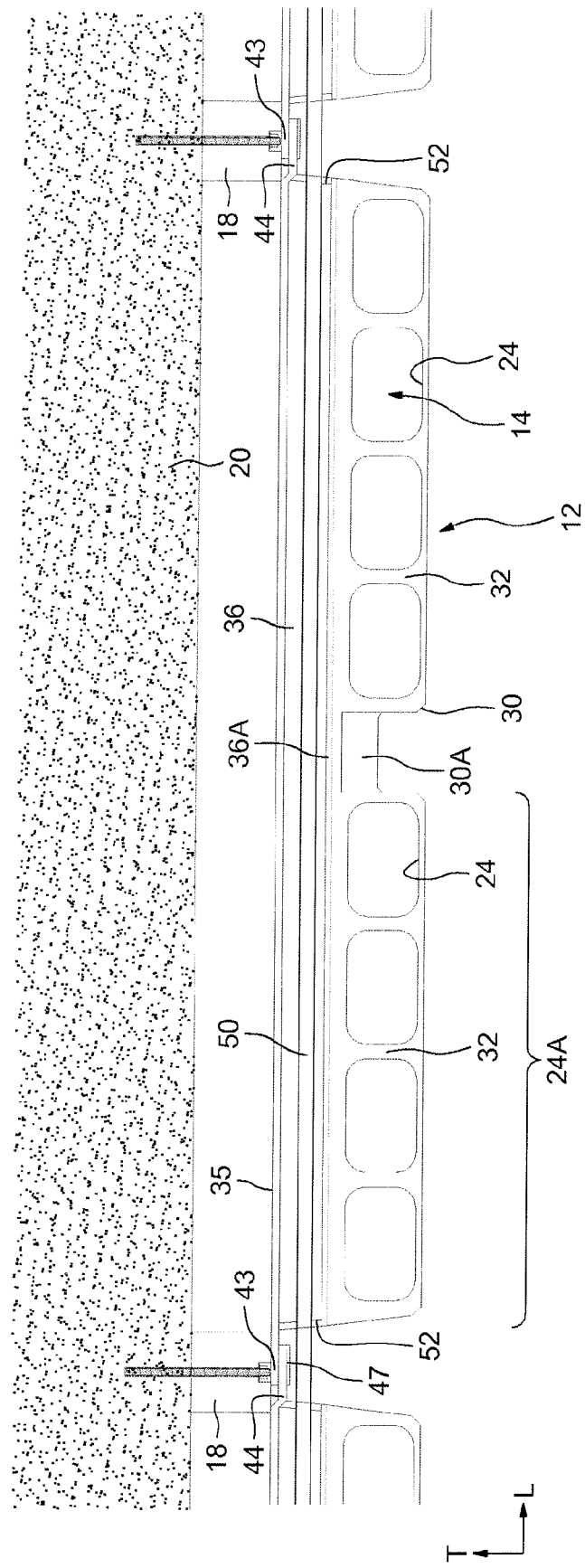
FIG. 4 is a schematic view of the top of the system of FIG. 1, installed on the wall.

Moreover, at the top of the walls and between the latter, each module 12 comprises a water inlet opening or slot 36, visible in FIG. 4. A top lip 36A delimits the front of the slot 36 being located above the highest rear end of the basically horizontal parts 32 of the front wall 30.

As shown in FIGS. 1 and 4, as the modules 12 are designed to be installed adjacent, one on top of the other and one beside the other to form the plant wall, the edges of the modules 12 overlap, for example over three centimeters, at the junction between the modules to prevent water leaking towards the rear of the system 10 forming the plant wall.

Thus the top edge 41 and the left edge 43 of each module 12 are flush with the rear face of the module. And the bottom edge 42 and the right edge 44 of each module 12 project forward with regard to the rear face of the module, with the projection being at least equal to the thickness of the top edge 41 and the left edge 43. The projections result from recesses 45 in the corresponding edges. Therefore, when modules 12 are positioned adjacent to each other along the wall 20, the right edge 44 of one of the modules 12 overlaps the left edge 43 of the laterally adjacent module and the bottom edge 42 of one of the modules 12 overlaps the top edge 41 of the vertically adjacent module. It is therefore difficult for the water to leak towards the rear of the modules 12.

Figure 5:
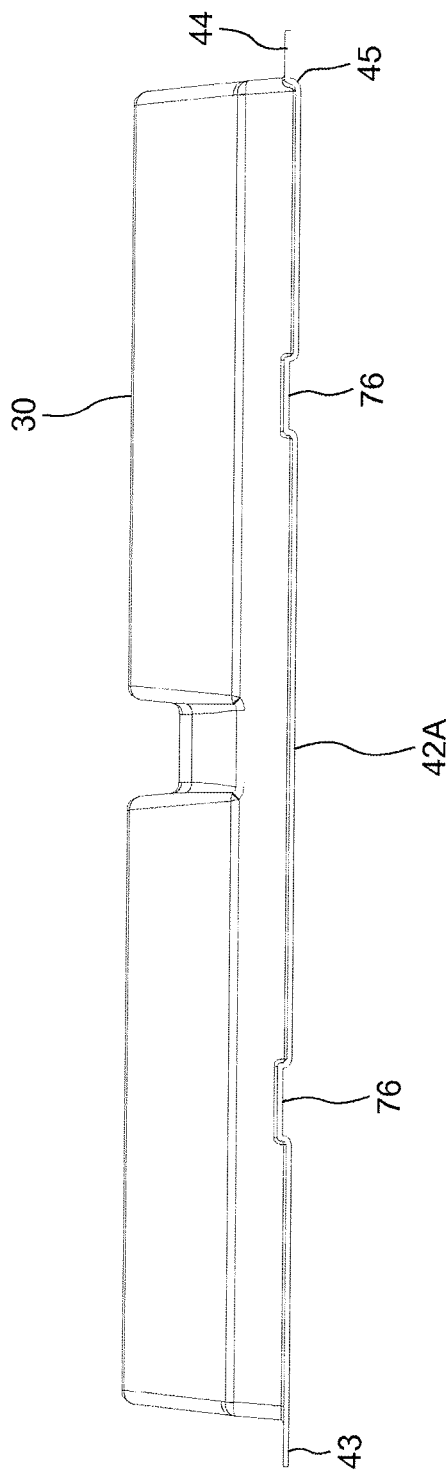
FIG. 5 is a technical drawing of a view of the underneath of the system of FIG. 1, not installed on the wall.
Figure 6:
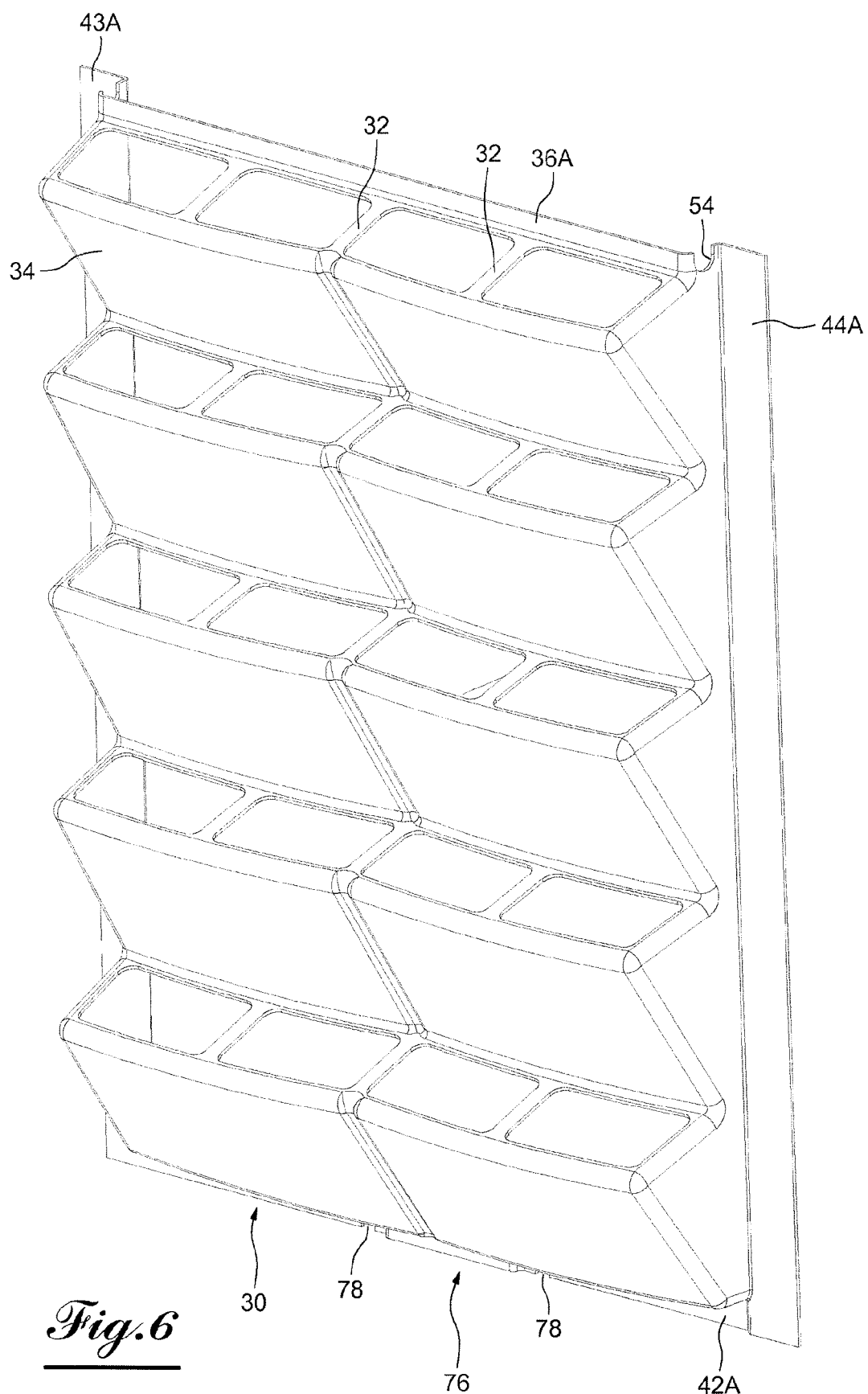
FIG. 6 is a three-quarter perspective frontal view of a front wall of an alternative embodiment of the module of the system of FIG. 1.
Figure 7:
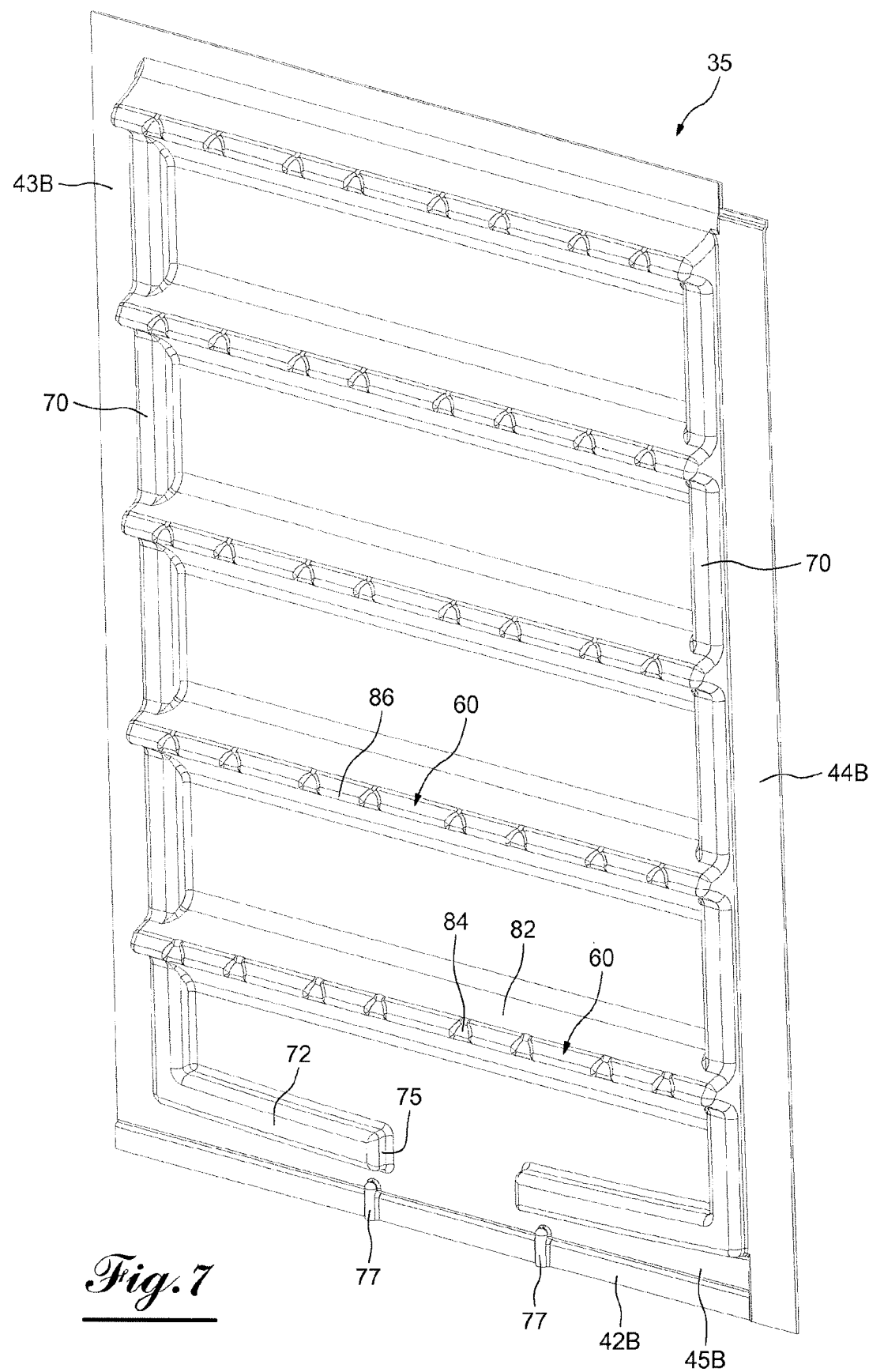
FIG. 7 is a three-quarter perspective frontal view technical drawing of a rear wall of the module of FIG. 6.
Figure 8:
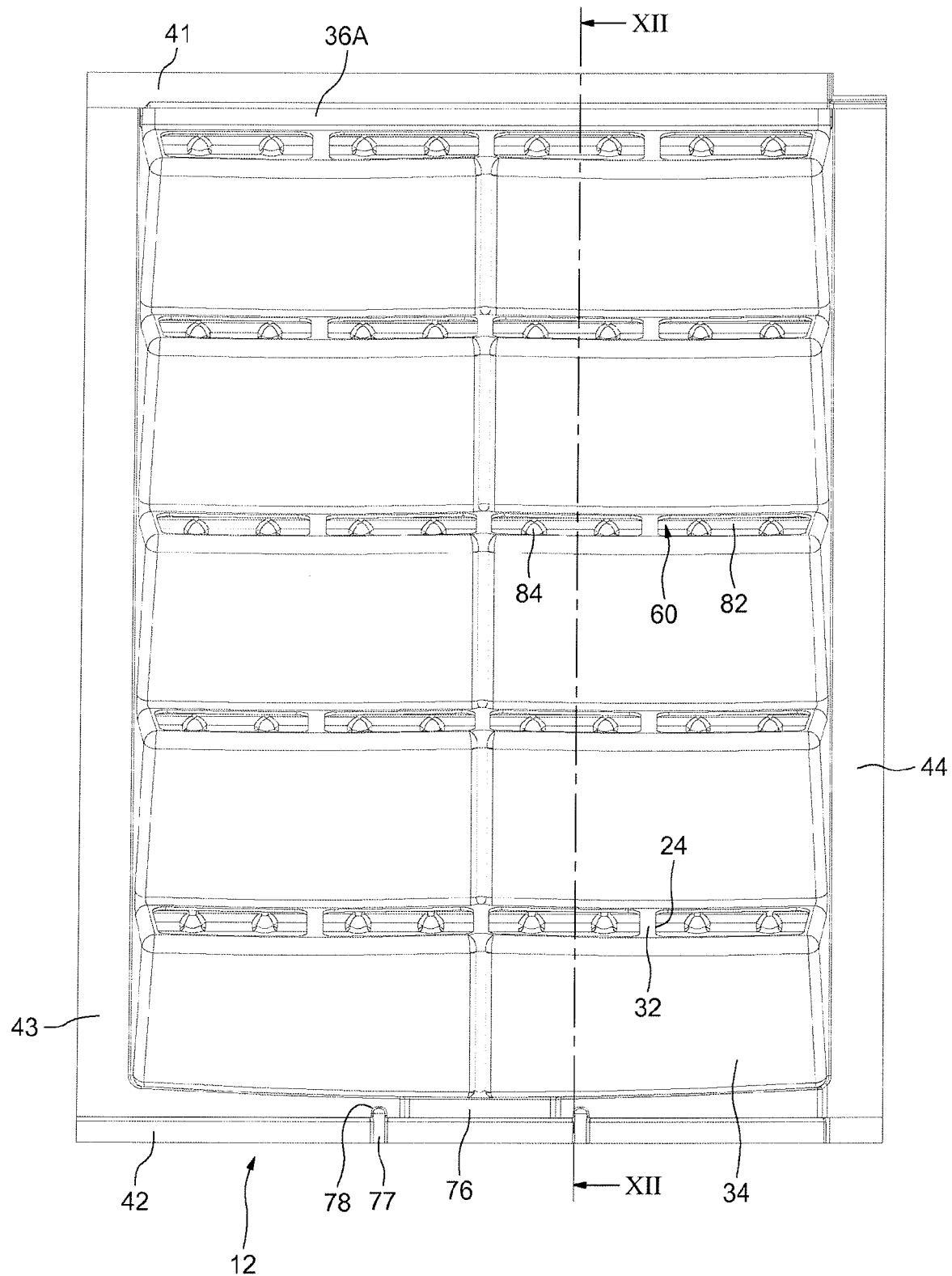
FIGS. 8, 9, 10 and 11 are technical drawings of the modules of FIGS. 6 and 7, front, top, bottom and side views respectively.
Figure 9:
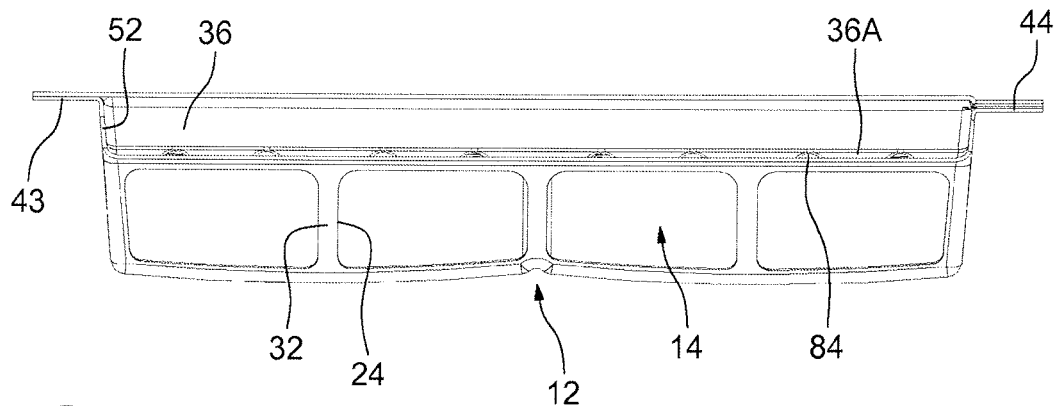
Figure 10:
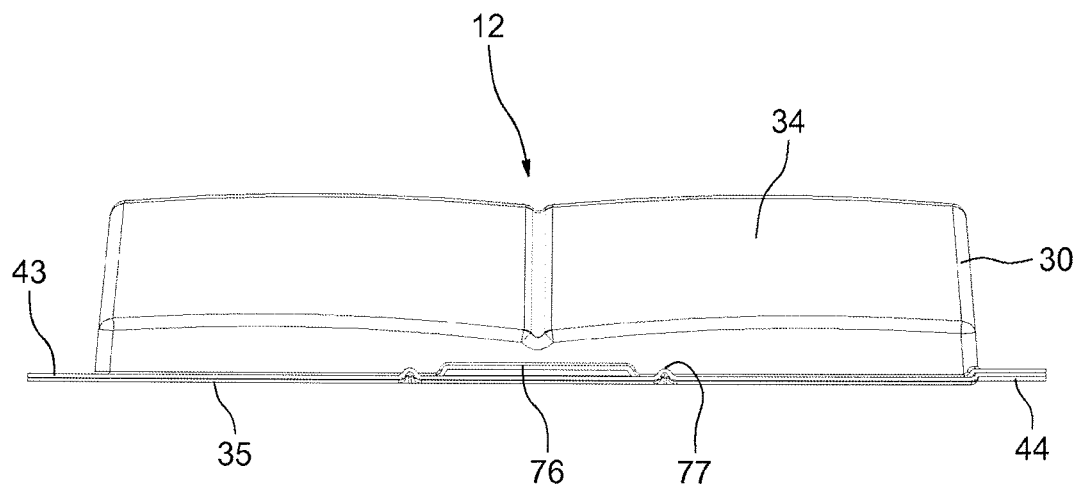
Figure 11:
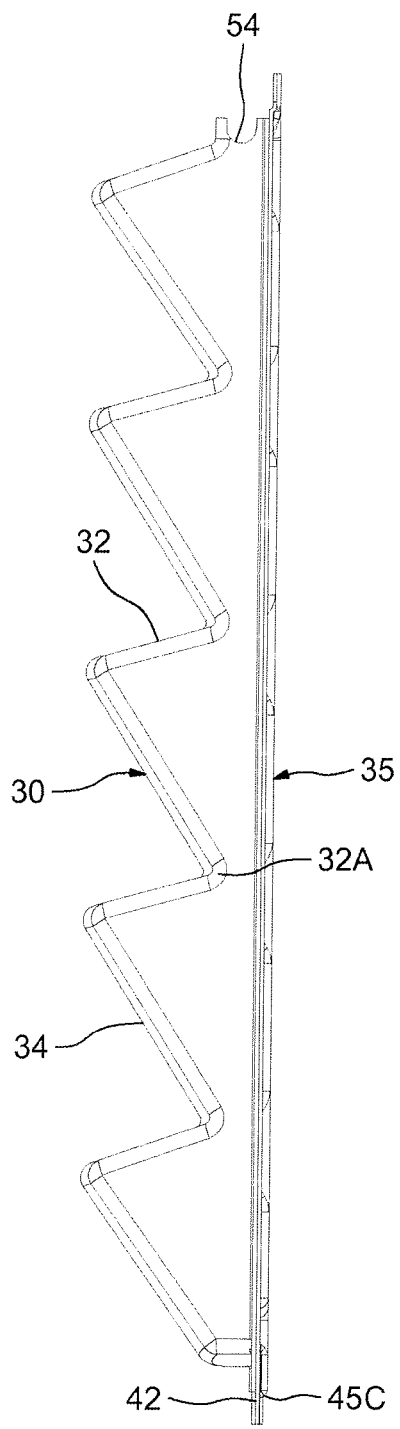

In FIG. 5, for example, the recess 45 between the right edge 44 and the rest of the rear face of the rear wall 35 is clearly visible. Other recesses 45 are visible in FIG. 3, for example above the bottom edge 42B of the rear wall 35.

Figure 3:
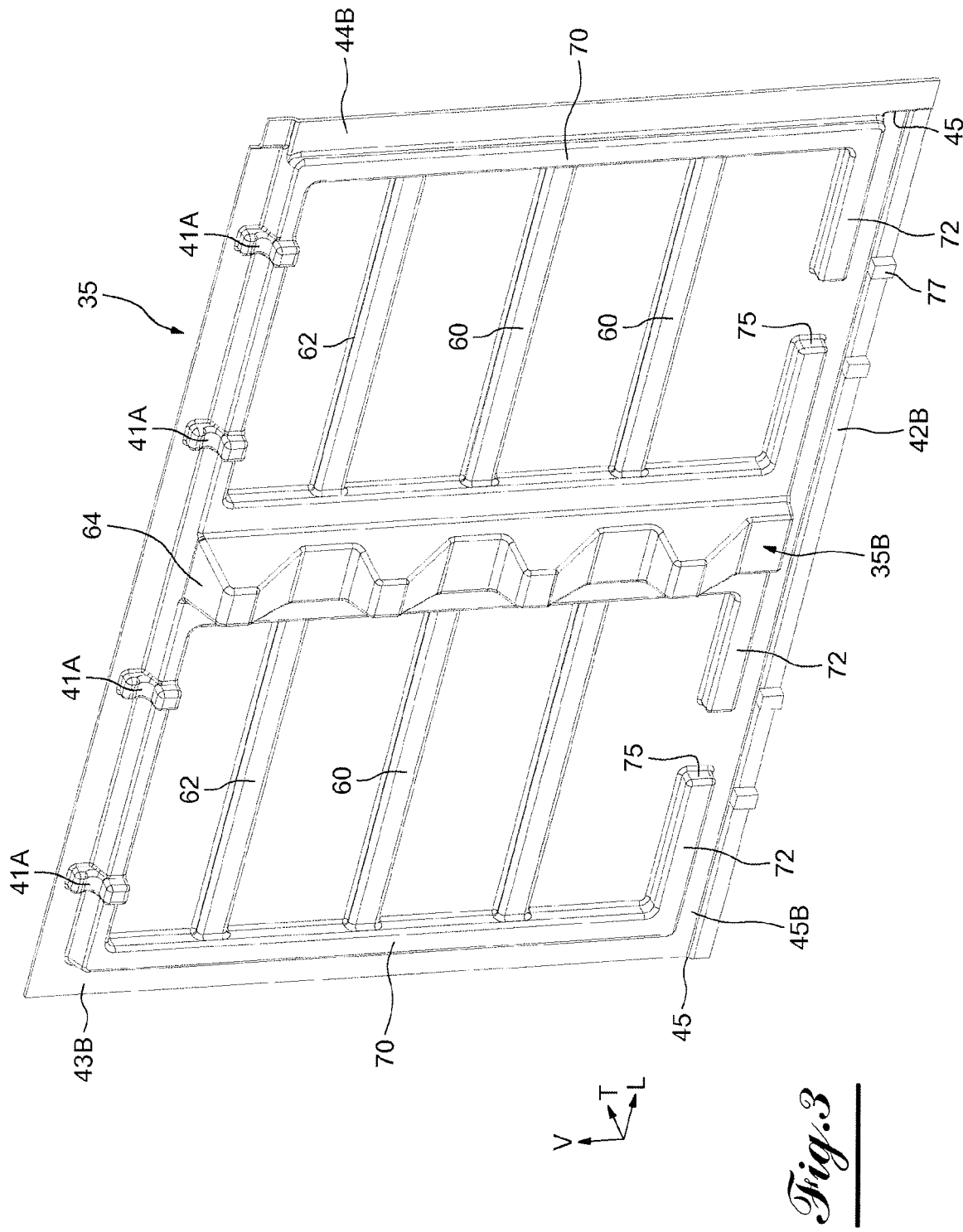
FIG. 3 is a three-quarter perspective frontal view technical drawing of a rear wall of the module of the system of FIG. 1.

As shown in FIG. 3, the rear wall comprises vertical stop lugs 41A which enable two adjacent modules to be wedged together in the vertical direction, with the bottom edge 42 of the top module resting on the stop lugs 41A of the bottom module. This arrangement avoids incorrect overlap of the edges of the modules.

Moreover, the vertical edges 43 and 44 of the modules 12 form fixing areas which are fixed onto the mountings 18, for example by screws 46 (FIG. 1). Plates 47 serve as washers and trim for protecting the edges of the modules. The mountings 18 here consist of wooden vertical uprights, themselves fixed to the wall 20 by screws 48. As a variant, the mountings are metal sections 18A with a basically omega section (FIGS.

28A, 28B) or metal sections 18B with an open rectangular section (FIGS. 92A, 29B), themselves fixed to the wall 20 by screws 48. The first variant will be chosen when adjacent modules have to be mounted overlapping each other, but the second variant will be chosen when adjacent modules have to be mounted—for whatever reason—laterally spaced from each other. In this case, the width of the section 18B must be determined in accordance with the desired spacing between the modules. Optionally, the open section 18B can be closed by a plate 49 shown in FIG. 29A by a dotted line.

According to a third variant, shown in FIGS. 30A, 30A, the mounting is built into the modules. In fact by forming in the front wall and rear wall fixing blocks 11 projecting towards the rear of the modules, the modules can be fixed directly to the wall 20 by screws 48 while maintaining a natural ventilation space between the wall and the modules.

The system 10 also comprises a horizontal drip watering pipe 50, which is positioned opposite the slot 36 so as to distribute water into the internal volume 14 through the said slot 36. The pipe 50 rests on the top end section 52 of the side walls of each module 12, passing in a lateral notch 54 of said walls. According to the alternative embodiment shown in FIG. 31, the pipe 50 is diverted downwards by at least one block 51 situated between the front wall 30 and the rear wall 35 halfway between the side notches 54 of the side walls and formed for example integrally with the rear wall 35. Because they are diverted downwards, the water drops do not go back up again towards the side walls of the module 12. At the left and right ends of the system 10, vertical ramps 53 are connected to the pipes 50 by known connectors to form the water circuit which also comprises a pump and known filters, if necessary connected to a water tank.

As shown in FIGS. 2 to 5, each module comprises, in addition to the water inlet slot 36, arrangements to manage the water circulation in the internal volume 14 and the discharge of excess water through the bottom edge 42. These arrangements are used to advantage to enhance the mechanical strength of the modules 12.

To control the internal flowing of the water along the rear wall 35, the latter wall comprises horizontal ribs which partition the internal volume 14, projecting towards the front in this volume. The horizontal partitioning ribs are referenced 60 in FIG. 3. Each partitioning rib is positioned in such a way as to be opposite the rear end edge 32A of each basically horizontal part 32 of the front wall.

In the first embodiment of the invention shown in FIGS. 1 to 5, each partitioning rib 60 comprises a basically square section and its width is such that it does not come into contact with the front wall 30 so as not to partition the internal volume 14, while allowing water to flow by run between the levels corresponding to the rows 22 of plants 16. However the partitioning ribs 60 slow down this flow. They comprise a top face 62 sloping forward and downward, for example by a few degrees.

The module comprises a central column, between the segments of the horizontal part 32 of the front wall 30 which corresponds to the groups 24A of openings 24. On the front wall 30, the central column, reference 30A in FIGS. 2 and 4, consists of segments set back in relation to the horizontal parts 32 and sloping parts 34. On the rear wall 35, the central column, reference 35B in FIG. 3, consists of bosses with a top face 64 parallel to the horizontal part 32 of the front wall 30 and sloping faces parallel to the segments set back with reference to the sloping parts 34.

The front wall 30 and the rear wall 35 are fixed, for example by laser welding, to the segments set back and the bosses of the central column respectively. In addition, the said walls 30 and 35 are fixed by the same technique to their front left edges 43A and 43B, their front right edges 44A and 44B and their bottom edges 42A and 42B respectively. The bottom edge 42A of the front wall 30 fits into the space 45B situated between the bottom edge 42B of the rear wall part 35 and an internal horizontal edge 72.

In addition to the horizontal ribs 60 which partition the internal volume 14 of the module, the rear wall 35 comprises on the perimeter of this volume 14, ribs projecting forwards forming internal vertical edges 70, connected to the lateral edges of the partitioning horizontal ribs 60. The basically horizontal internal edge 72 is connected to the bottom edge 42B of the rear wall 35 and at its lateral ends to the internal vertical edges 70, at the bottom corners of the rear wall 35.

Rear notches 75 are made in the internal horizontal edge 72, on the right and on the left at one quarter of the length of the modules 12 (FIG. 3). Corresponding to these, front notches 76 are made in the bottom edge 42A of the front wall 30, on the right and on the left at one quarter of the length of the modules 12 (FIG. 5). These notches 75 and 76 allow water to be discharged, for example if there is rain causing overwatering.

In addition to the notches 75 and 76, the front wall 30 and the rear wall 35 comprise bosses 77 and cut-outs 78 respectively which are intended to stop the lateral flow of water or runoff arriving from the notches.

In the embodiment described above, the front wall 30 and rear wall 35 are separate parts made of ABS (acrylonitrile butadiene styrene) based polymer for example obtained from thermoforming or injection. As a variant, especially when the module has only one row 22 of plants or only one place for plants, these walls may come from the same piece obtained by blowing.

The invention enables a plant wall to clad a building, while improving its thermal insulation, and comprising the following advantages:

robustness of the modules which are fixed independently, simplicity of manufacture, in particular without needing an intermediate mounting frame;

water-tightness of the modules;

control of internal water flow and flow from the modules to the outside, good water management;

secure plant retention because of the basically horizontal position of the plant passage holes;

quality and reliability of the seal between the modules, achieved by the overlapping edges of modules accepting splashes and without risk of incorrect assembly;

simplicity of installation, with the possibility of compensating for irregularities in the flatness of the building wall;

ventilation between the rear of the plant wall and the building to avoid condensation problems, by using mounting uprights;

ease of planting and plant maintenance operations, creation of additional green spaces.

A second embodiment of a module according to the invention, which is a variant of the embodiment described above, is shown in FIGS. 6 to 14.

In this embodiment, the modules are of different sizes, in other words 1 meter high by 80 centimeters long. The openings 24 are larger and there are four per row, still divided into two groups, to permit wider spacing between plant bundles.

The stop lugs are not there, but the stop function is achieved by the top edges 41 abutting as necessary against the recess resulting from the offset 45C (FIG. 11) between the bottom edge 42B and the rear face of the rear wall 35 close to the space 45B situated between the bottom edge 42B and the internal horizontal edge 72. The assembly of the edges is kept as it is, as may be clearly seen in FIGS. 13 to 15.

The differences mainly concern the partitioning ribs 60.

Figure 12:
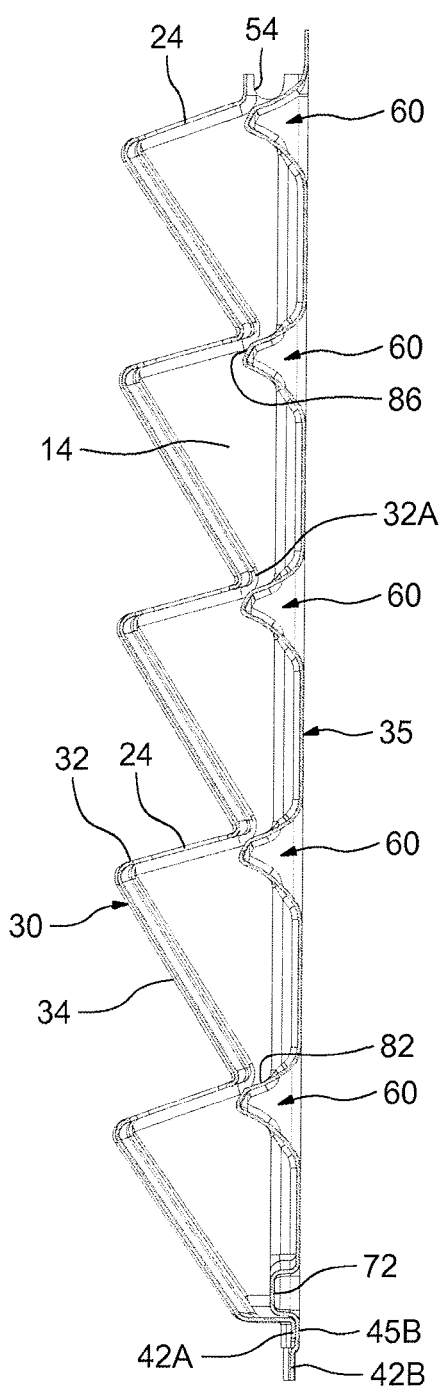
FIG. 12 is a vertical section according to the XII-XII line of FIG. 8.
Figure 13:
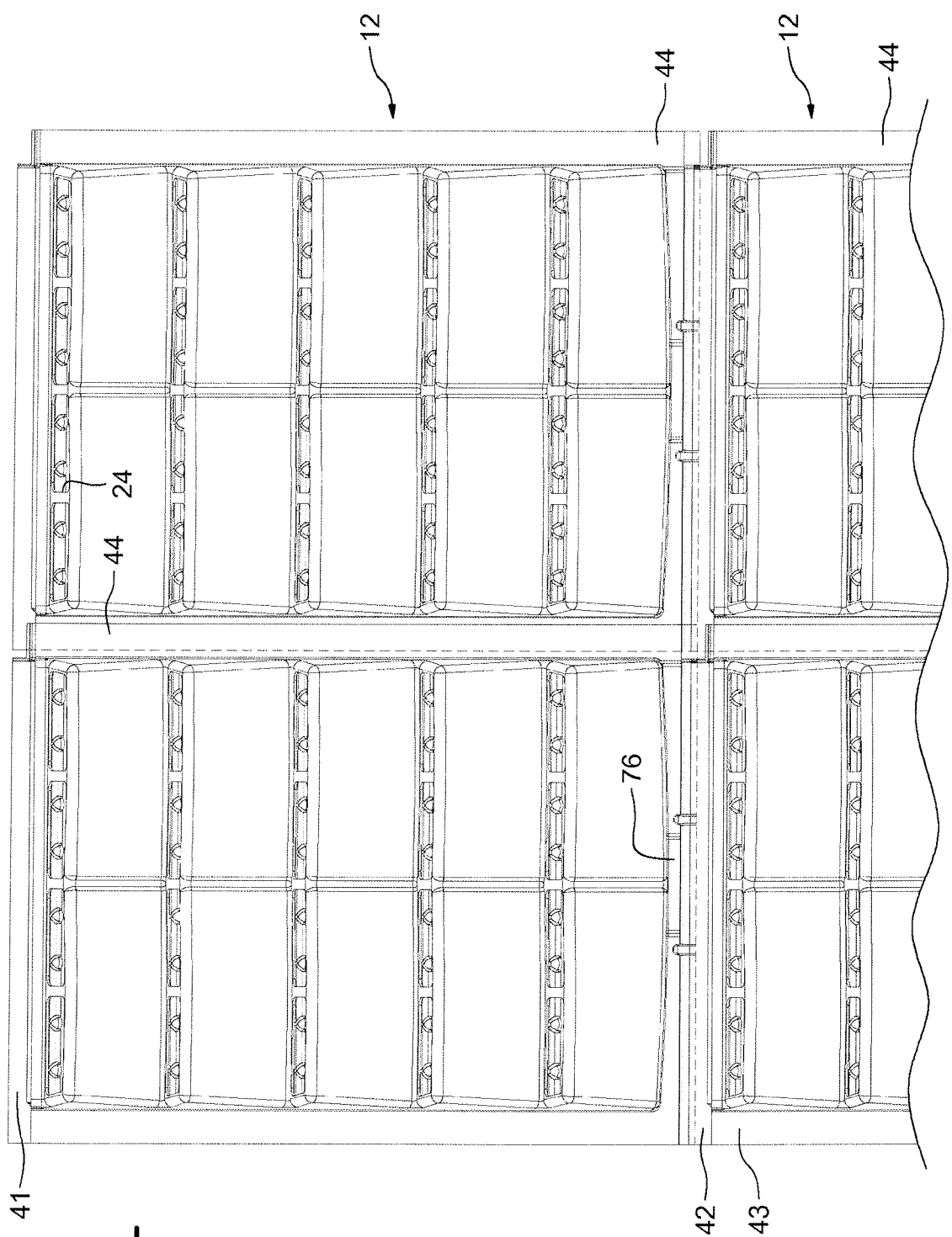

Each partitioning rib 60, at the top and bottom of the levels, comprises a basically triangular section. It comprises a top face 82 sloping forwards and downwards, for example at 30 degrees. This top face 82 comprises indents 84 which serve as a canal for the passage of water between two rows 22 of plants 16 in the module 12 or between the water inlet slot 36 towards the internal volume 14. Between the indents 84, the front end edge 86 of the rib 60 is fixed, for example by laser welding, to the rear end edge 32A of each basically horizontal part 32 of the front wall, as shown in FIG. 12.

A single notch 75 and a single notch 76 are located halfway along the length of the module. The central column is omitted as the partitioning ribs 60 are longer and strengthen the entire length of the module.

A first variant of this second embodiment of the invention is shown in FIGS. 32A to 32C. This variant mainly concerns the position of the partitioning rib 60.

In order to ensure better water distribution of irrigation water for each row of plants, the water coming from the watering pipe 50 or from the top row 22 is directed towards the top of the plant balls by a rib 60 positioned slightly, in other words about 1 to 3 cm, below the bottom edge of the openings 24 of each row 22.

This variant moreover concerns the presence of a block 51 at the top of the module. The block 51 is positioned so as to hold in place the watering pipe 50, to advantage but not necessarily with a downward deviation, and to form at the same time a means whereby the module can be gripped for any maintenance of the latter.

Figure 16:
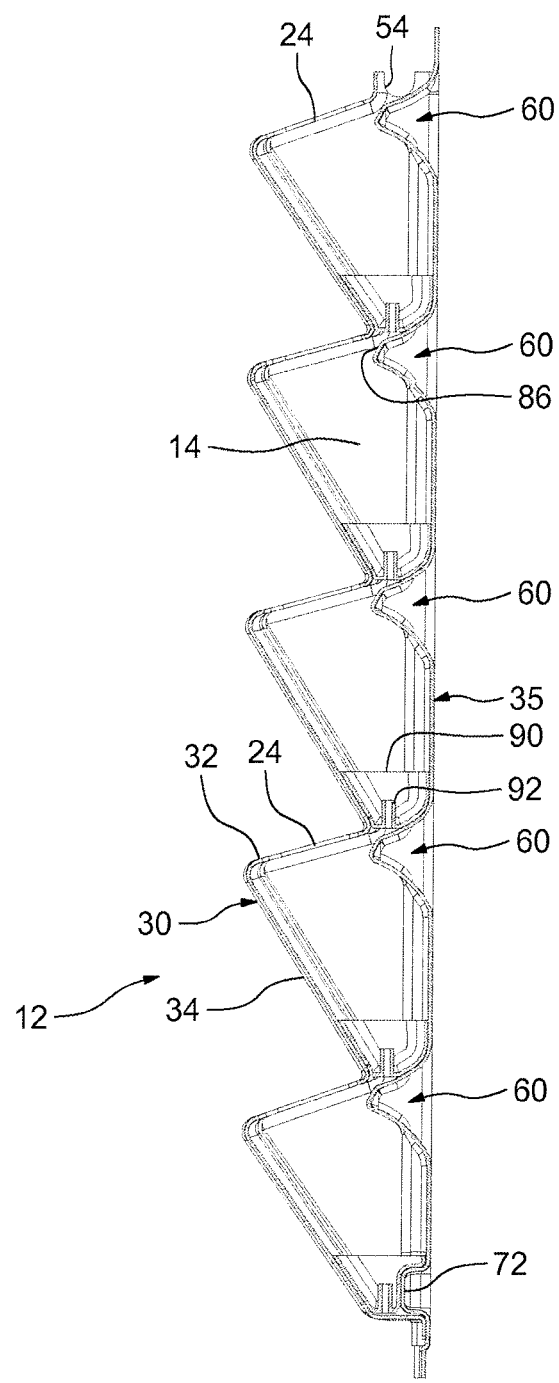
FIGS. 16 and 17 are sections of an alternative embodiment of the modules of FIGS. 8 to 11.
Figure 17:
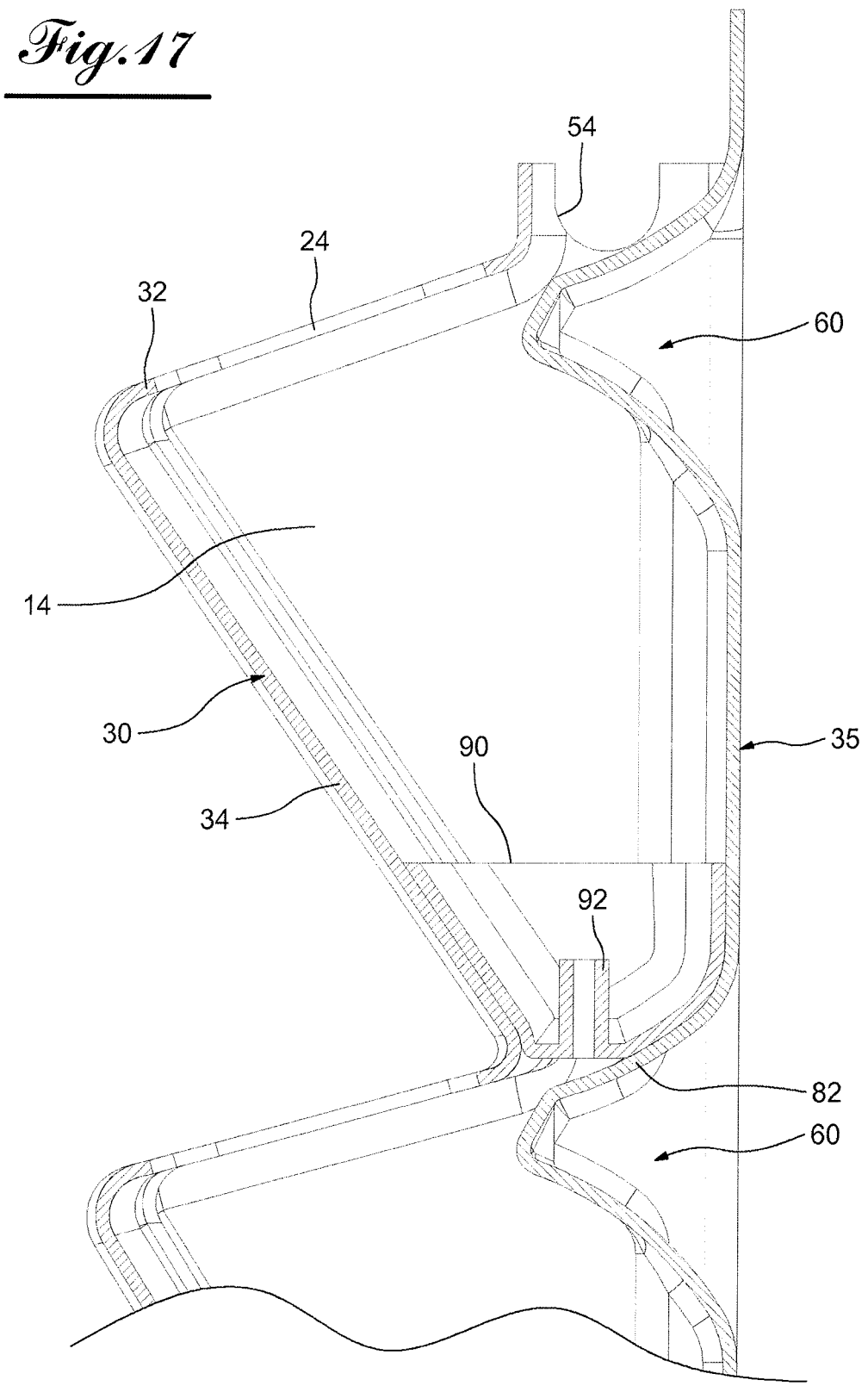
Figure 19:
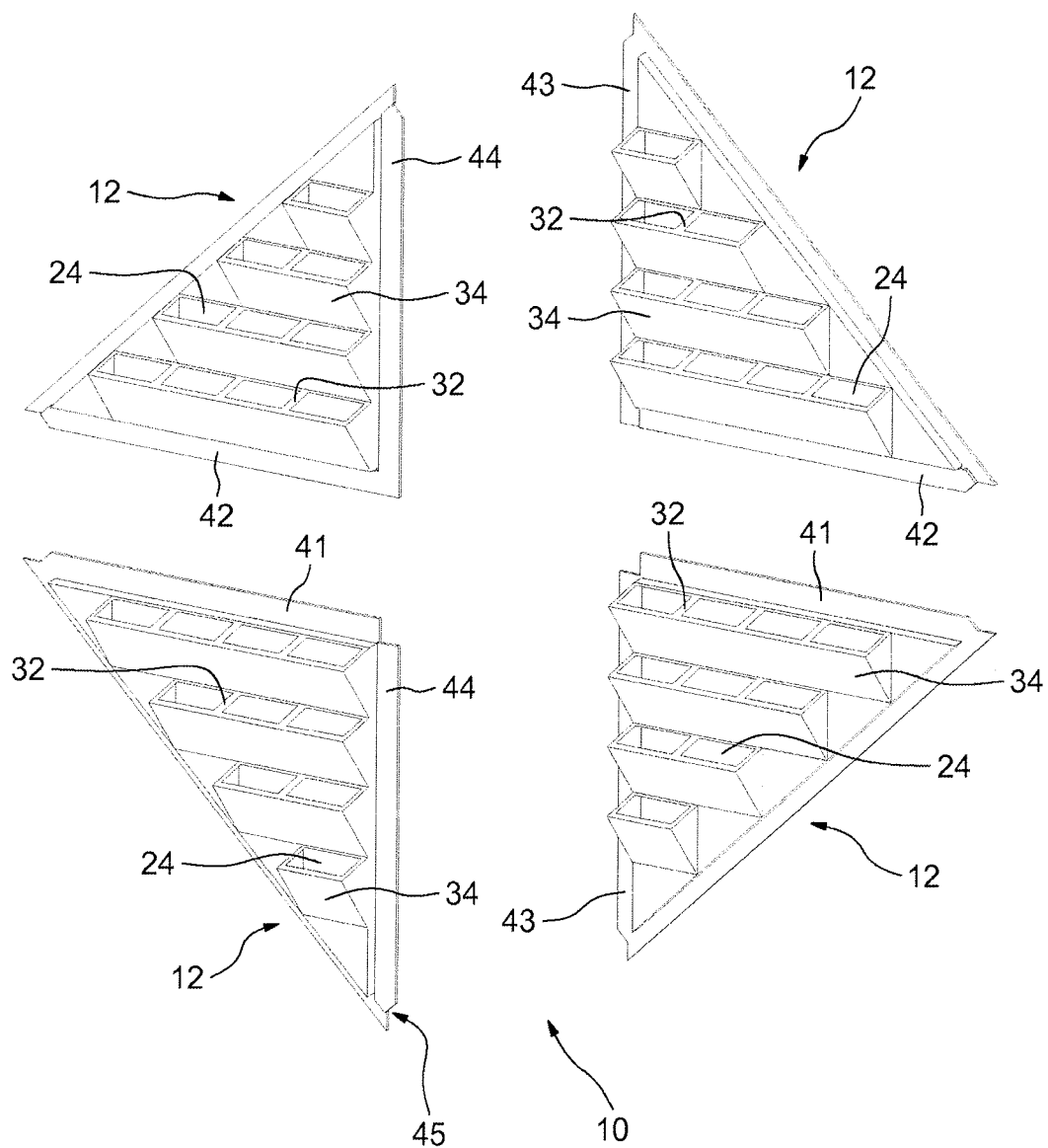

A second variant of the second embodiment of the module according to the invention is shown in FIGS. 16 to 17.

In this variant, water tanks 90 are positioned at the bottom of each row 22 resting on the one hand on the internal face of the sloping parts 34 and on the other hand on the upper face 82 of the partitioning ribs 60 or on the horizontal internal edge 72. These water tanks are formed with an overflow pipe 92 enabling both water to be kept in the tank 90 and water to be discharged when the said tank is sufficiently full.

This variant of the second embodiment is particularly suited to hot countries, where the water is required in larger quantities and is not likely to freeze in the tank 90.

According to a third variant of the second embodiment of the invention, the water tank consists of a removable tank 94 shown in FIG. 33. The tank 94 is an elongated basin with external dimensions adapted to the internal dimensions of the bottom of the rows 22 and presenting a sloping front wall 95 and a sloping rear wall 96, these two walls being in contact with the front and rear walls of the module. The rear wall 96 is formed with recesses 97 which ensure space for surplus water.

In FIGS. 18A to 18F, a gutter 100 is designed to be installed between two vertically adjacent modules 12. This gutter 100 also comprises a top edge 41 and an overlapping bottom edge 42, on the same principle as the overlapping edges of the modules 12. The water flowing through the notches 75 and 76 is collected by the gutters 100 to be sent via vertical discharge pipes 100V to, for example, a tank which feeds water to the system according to the invention.

Each gutter 100 comprises a horizontal pipe 100L equipped with a water guide rim 101 which is open opposite the top edge 41 and a notch 76, being longer than the latter and the distance separating the cuts 78, and which surrounds three sides with a water inlet channel 101A.

During assembly, for example in the factory, before assembly along a wall, the bottom edge 42 of the adjacent module which is on top is inserted between the top edge 41 of the gutter 100 and its guide rim 101, the latter being opposite the notches 75 and 76 of the said module 12. Thus, the water can flow from the notches 75 and 76 to the channel 101A, without spilling onto the sides.

Advantageously, between the lip 42 of the gutter and the bottom edge 42 of the latter, a rear horizontal wall 102 of the gutter, shown in FIGS. 18A and 18F, comprises ventilation holes 103 forming air passages between the outside and the rear of the system, to avoid condensation between the system and the building supporting it.

The horizontal pipes 100L and vertical discharge pipes 100V are connected by coupling sleeves 104, as shown in FIGS. 18B and 18C.

According to a variant shown in FIGS. 34A, 34B, the gutter—reference 110—is built into the overlapping assembly of the module 122 by means of an appropriate ledge in the front wall. The gutter 110 is formed with a slope so that the water flows towards one side of the module. In the example of FIG. 34B, the water flows towards the left side of the module 122.

In a third embodiment represented in FIGS. 19 to 22, the modules are of a general triangular shape instead of rectangular, in order to be positioned in a lozenge configuration on a wall, as decoration and thermal insulation partially covering a façade. The rows of plants are adapted to the shape of the modules. The overlaps of the vertical and horizontal walls are made in accordance with the same principle as that described above, with the overlapping edges covered by judicious recesses 45.

FIGS. 23 to 27 show an embodiment of the system of the invention mainly intended for internal use, for example to divide a large space into several workplaces and thus obtain a "landscaped office".

The system of the invention comprises several modules 112 fixed to vertical mountings 118 joined to a base 120 possibly mounted on wheels 121 so as to be mobile.

Each module 112 comprises two horizontal rows 122 of two compartments 123 connected to each other. However each compartment 123 comprises its opening 124 for inserting a substrate and plants.

Figure 23:
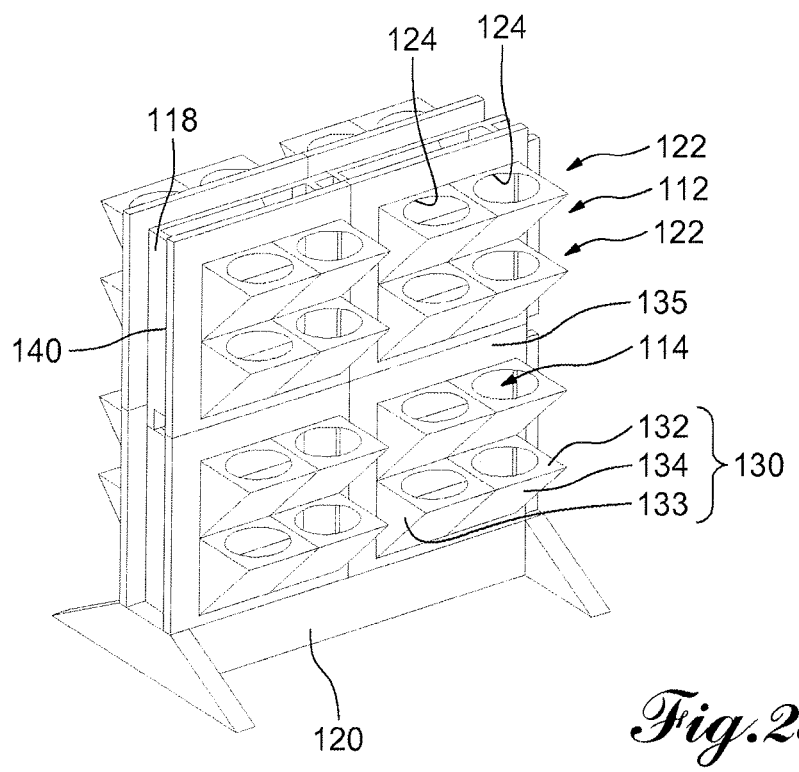
FIGS. 23 to 27 are schematic views of other embodiments of the system according to the invention, mainly intended for use inside a building.
Figure 24:
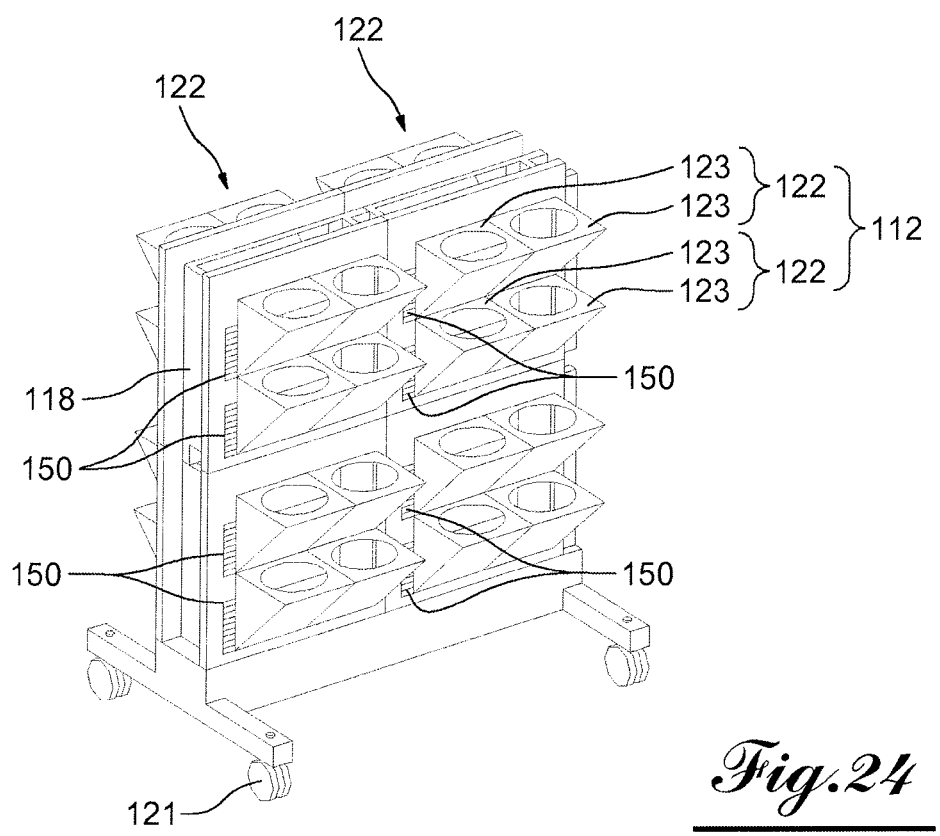

Thus the system shown in FIGS. 23 and 24 comprises, on each side of the mountings 118, four modules 112 each having four compartments 123 for receiving plants.

It goes without saying that the design shown in the drawings is in no way limiting with regard to the number of rows and, for each row, the number of compartments. Thus each row may also comprise either a single compartment 123 or two, three, four or even more compartments 123. The example of embodiment of two rows with two compartments is entirely arbitrary but could constitute a practical solution depending on the dimensions decided for the modules. In fact, the number of rows and compartments will depend not only on the requirements with regard to combining modules for a given space, but also on the weight of each module and so the maneuverability of these modules by the workmen, which is generally more limited inside a building than out in the open.

Each row 123 comprises a volume 114 delimited by a front wall 130 and a rear wall 135 joined to the front wall 130. The front wall 130 comprises a basically horizontal part 132 with openings 124, a part sloping downwards and towards the rear 134 giving the volume 114 a basically triangular section and two lateral walls 133, right and left respectively. Each basically horizontal part can be made with a forward slope of between 0° and about 10°, depending on manufacturing constraints, aesthetic criteria or other reasons. As for the first embodiment, this slight slope makes it possible to avoid retention of water and dead leaves on the perimeter of the openings 124.

The walls 130 and 135 can be made independently from each other and then assembled in a water-tight manner, for example by gluing, and presenting an area 140 for fixing the module to the mountings 118. However, in particular depending on the material from which the modules are made, the modules can also be formed from a single piece, with the front and rear walls then being joined to each other by forming. There may be a gauge 150 (see FIG. 24) to make it easier to check the moisture of the substrate filling the volume 114.

As the system according to this embodiment is designed for manual watering, there is no inlet for the irrigation water and fertilizer. The water, if necessary comprising fertilizer or nutritive additives, is inserted into the volume 114 through the openings 124. However, for special applications, there may be openings for the insertion of irrigation water, for example on the horizontal part 132 of the front wall 130.

Figure 25:
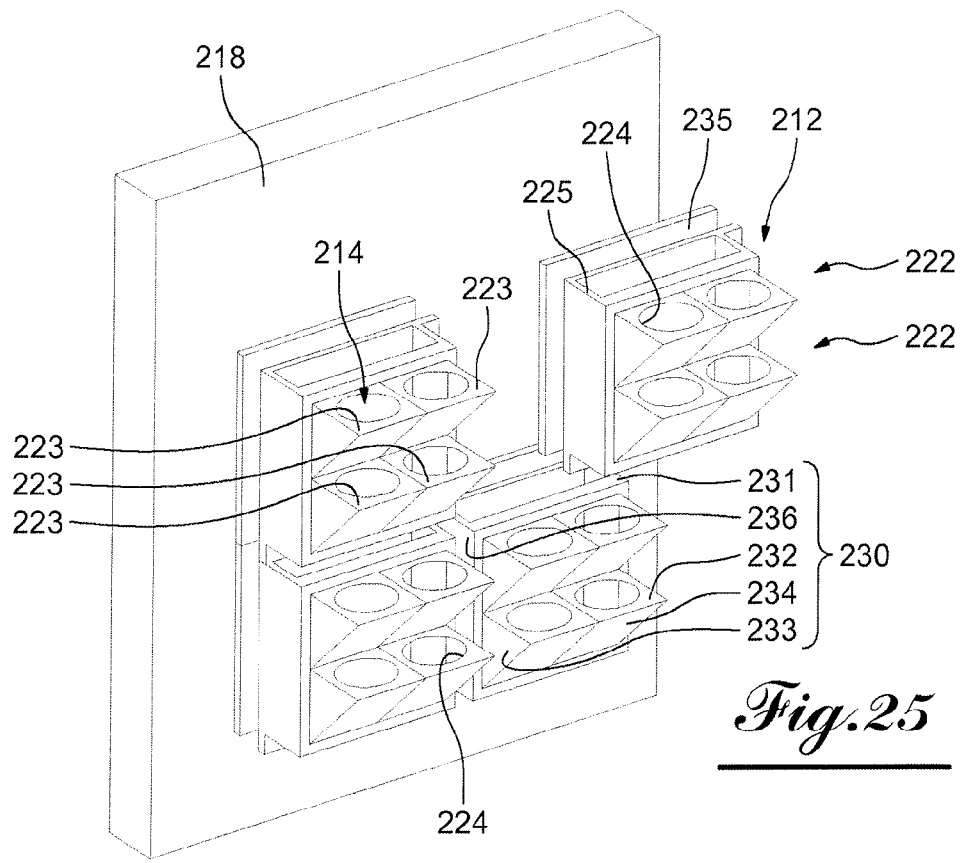
Figure 26:
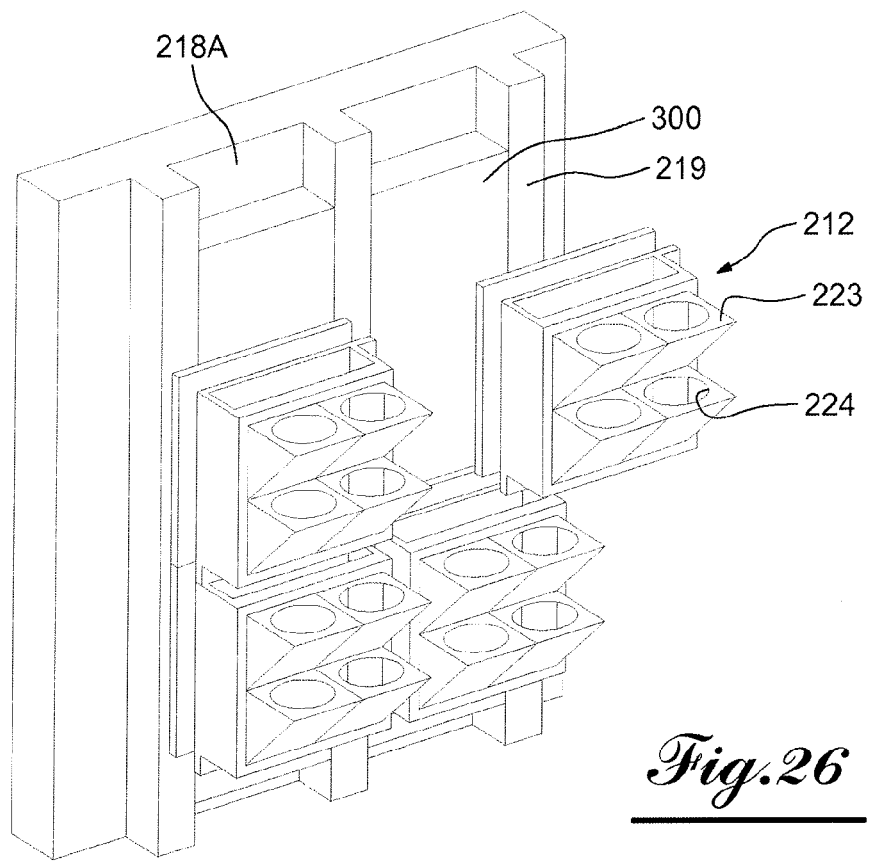
Figure 27:
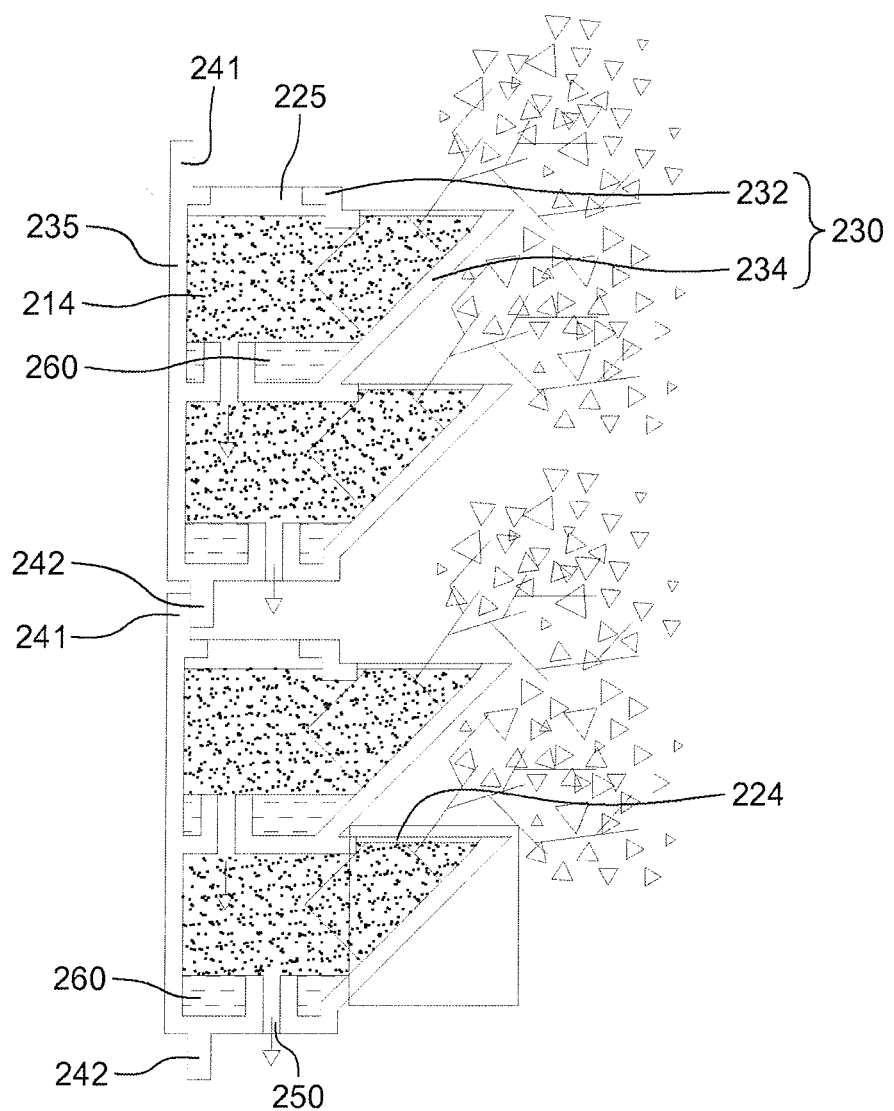

Thus, according to the variant of realization of the system of the invention, shown in FIGS. 25 to 27, the system comprises, mounted on a mounting 218, four modules 212 each having four compartments 223 positioned in two horizontal rows 222, for receiving plants. The modules 212 are each formed with a single piece, but they may also be made of several pieces, for example in a front wall and a rear wall, formed separately and then assembled.

Each row 222 comprises a volume 214 delimited by a front wall 230 and a rear wall 235 joined to the front wall 230. The front wall 230 comprises a basically horizontal part 232 equipped with openings 224 for the plants and extending towards the rear by means of a part 231 equipped with an opening 225 for inserting substrate and for watering, a part sloping downwards and towards the rear 234 giving the volume 214 a basically trapezoidal section and two lateral walls 233, right and left, extending towards the rear by means of two parts 236. Each basically horizontal part 232 may be made with a slope towards the front of between 0° and about 10°, depending on manufacturing constraints, aesthetic criteria or other reasons. As for the first embodiment, this slight slope makes it possible to avoid the retention of water and dead leaves on the perimeter of the openings 224.

As is visible in FIG. 27, each row 223 is formed with a water drain 250. The water outlets from these water drains are positioned so that the water coming out of a row enters the row positioned underneath, and so on until the last row, in other words the row closest to the ground. There will then have to be a gutter underneath this row for discharging the water to a collection place or any other means of collecting and discharging the water or re-inserting the water in the top row.

As may also be seen in FIG. 27, each of the rows 223 is to advantage equipped with a tank 260 for the irrigation water which enables watering to be carried out at less frequent intervals. In this case, the water drain from the row 223 takes the form of an overflow 250.

FIG. 27 also shows that the front wall 230 and rear wall 235 have their respective top and bottom edges arranged so that, when two modules are fitted one on top of the other, the bottom edge of the top module covers the top edge of the bottom module.

With regard to the practical aspect, as shown in FIG. 27, the rear wall 235 comprises a top edge 241 formed on the same place as that defined by the wall 235 and the front wall 230 comprises a bottom edge 242 formed on a parallel plane and further forward in relation to a plane of assembly of the front and rear walls.

It goes without saying that this design is valid, similarly, when the modules or at least the rows are made in a single piece.

Although FIG. 27 shows module 212 with two rows 223 connected to each other by at least one water drain, it goes without saying that, when a module 212 has only one row 223, the water drain can be designed and positioned on the module so that the water does not necessarily come out through the bottom of the row but, for example, through an opening formed in part 236 of one of the lateral walls 233.

While FIG. 25 shows the system of the invention with four modules 212 mounted on a flat mounting 218, FIG. 26 shows the same system mounted on a mounting 218A shaped to receive the insulation material.

In fact, the mounting 218A is formed, like the mounting 218, like a parallelepiped body or a thick panel, compared to the thickness of the walls of the system 212. The mounting 218A also comprises, opposite mounting 218, three ribs 219 for fixing the system at a distance from the mounting. The space thus created between the rear wall 235 of the module 212 and the mounting 218A allows a panel of heat and/or sound insulation 300 to be laid between the mounting and the system.

With regard to the practical aspect, when the mounting is for example a wall to be decorated, the ribs are rails, battens or any other appropriate component which enables the modules of the system according to the invention to be mounted at a distance from the wall. The rails etc. can also be used to fix the insulation material.

While most of the examples of embodiments of the system of the invention described above and shown in the drawings concern the application of the invention on a surface such as a wall of a room or a façade of a building, the system shown in FIGS. 23 and 24 is designed so as to be able to serve as a fixed or mobile divider of spaces with plants on both sides of the system. For this purpose, the system comprises, on each side of the mountings 118, four modules 112 each having four compartments 123 for receiving plants.

According to a variant shown in FIG. 35, the system is made so as to be able to serve as a fixed or mobile divider of spaces with plants on both sides of the system but without a mounting between the two sides. The system, reference 410, comprises four modules 412 mounted on top of each other, with each having, on each of the two opposite sides formed by a front wall 430 and a rear wall 435, a row of openings 424 through which plants can be inserted and planted in the module. Thus both walls may be considered equally well as the front wall or the rear wall. Moreover, the modules 412 may be designed with or without an overflow.

The system according to this invention is designed in a modular manner. It is thus possible to cover areas of all sizes and with variable geometries. For this purpose, the modules are formed so as to be able to be assembled with each other with the corresponding top, bottom and side edges overlapping when they cover or form a flat surface.

However, when the system of the invention is used as a space divider and the division is not made, or not fully made, along a straight line, the modules or assemblies of modules must nevertheless be able to be connected to each other.

The modules or assemblies of modules are then connected by joints, of which FIGS. 36 and 37 show only two examples of realization.

According to the example of FIG. 36, four assemblies 200A to 200D each comprising two modules 212 one on top of the other, are connected to each other by hinges of which each is formed by four tubes joined to each side of the modules and by a rod 274 passing through the tubes. Thus each assembly of modules comprises on the left side two rear tubes not shown and so without reference and two front tubes 273. The tubes on the left side and the tubes on the right side are positioned offset from each other in terms of height in order to form hinges as explained below. By positioning to advantage but not at all necessarily, the left rear tubes 271 vertically offset in relation to the left front tubes 272 and, in a similar manner but inversely offset, the right rear tubes in relation to the right front tubes 273, the assemblies of modules are reversible with regard to their attachment. The rod 274 is joined to a platen 275 which forms a support for the system.

The tubes 271 to 273 to be connected to each other are selected in accordance with the direction of the joint to be made. According to the example shown, the assembly 200A is connected to the assembly 200B by hinges formed by the rear tubes with no reference (because they are not shown) on the right side of the assembly 200A and the rear tubes 271 of the left side of the assembly 200B to form an angle opening towards the rear of the system. The assemblies 200B and 200C are connected to each other either by the rear tubes or by the front tubes to be kept aligned with each other. And the assembly 200C is connected to the assembly 200D by the front tubes 273 of the right side of the assembly 200C and the front tubes 272 of the left side of the assembly 200D to form an angle opening towards the front of the system.

The example shown in FIG. 37 differs from that of FIG. 36 in so far as the tubes forming the hinges are positioned in the middle of the side faces of the assemblies or modules 212A, 212B. Thus, the modules 212A and 212B have on their left side a tube 281 and on their right side a tube 282. The tubes 281 and 282 are positioned at different levels to be able to be assembled to form hinges. When the assembly 212A is connected to assembly 212B, the tube 282 of the assembly 212A and the tube 281 of the assembly 212B form the hinge 280 in conjunction with a rod 283 which passes through the two tubes.

FIGS. 38A and 38B show, as the final embodiment of the invention, a decorative arrangement for example forming part of the urban furniture and intended to be placed for example at the entrance of a town or park.

The decorative arrangement comprises a system of the invention with modules 12 mounted on a metal structure with a framework 618 embedded in the ground. The decorative arrangement is completed by a pole 619 positioned beside the system of the invention and carrying leaves 620 and a sign 621 stating the name of the town or park. As shown by FIG. 38B, the system of the invention can comprise modules 12 on one side or both sides of the structure 618.

The invention claimed is:

1. A system for plant cultivation in containers located in a vertical or sloping arrangement on different levels, the system, comprising:
a module including
an internal volume for receiving at least one nutritive substrate and at least one plant, wherein the internal volume is delimited by
a front wall having at least one opening for the plants to pass through for exposure to light, and
a rear wall joined to the front wall, wherein
the rear wall has a fixing area for fixing the module to a mounting, and
the rear wall comprises a partitioning rib projecting into the internal volume to slow flow of water flowing between the levels; and
a water drain opening at a lower part of the internal volume, wherein
the water drain extends into a bottom edge of the module, and
the bottom edge comprises at least one front notch for the opening.

2. The system according to claim 1, further comprising a gutter for collecting water passing through the water drain.

3. The system according to claim 2, wherein the bottom edge of the front wall includes a shelf and the gutter is built into the bottom edge by the shelf.

4. The system according to claim 1, wherein the partitioning rib comprises a top face sloping downward.

5. The system according to claim 1, wherein the partitioning rib has a width and does not come into contact with the front wall and does not fully partition the internal volume.

6. A system for plant cultivation in containers located in a vertical or sloping arrangement on different levels, the system, comprising:
a module including
an internal volume for receiving at least one nutritive substrate and at least one plant, wherein the internal volume is delimited by
a front wall having at least one opening for the plants to pass through for exposure to light, and
a rear wall joined to the front wall, wherein
the rear wall has a fixing area for fixing the module to a mounting, and
the rear wall comprises a partitioning rib projecting into the internal volume to slow flow of water flowing between the levels;
a water drain opening at a lower part of the internal volume; and
a gutter for collecting water passing through the water drain.

7. The system according to claim 6, wherein the bottom edge of the front wall includes a shelf and the gutter is built into the bottom edge by the shelf.

8. A system for plant cultivation in containers located in a vertical or sloping arrangement on different levels, the system, comprising:
a module including
an internal volume for receiving at least one nutritive substrate and at least one plant, wherein the internal volume is delimited by
a front wall having at least one opening for the plants to pass through for exposure to light, and
a rear wall joined to the front wall, wherein
the rear wall has a fixing area for fixing the module to a mounting, and
the rear wall comprises a partitioning rib projecting into the internal volume to slow flow of water flowing between the levels;
a water inlet hole between the front wall and the rear wall; and
a removable tank in fluid communication with the water inlet hole.

9. A system for plant cultivation in containers located in a vertical or sloping arrangement on different levels, the system, comprising:
a module including
an internal volume for receiving at least one nutritive substrate and at least one plant, wherein the internal volume is delimited by
a front wall having at least one opening for the plants to pass through for exposure to light, and
a rear wall joined to the front wall, wherein the rear wall has a fixing area for fixing the module to a mounting, the rear wall comprises a partitioning rib projecting into the internal volume to slow flow of water flowing between the levels, the partitioning rib has a top face comprising indents providing at least one channel for passage of water, and a front side edge of the partitioning rib, between the indents, is fixed to the front wall.

* * * * *